(12) United States Patent
Wu et al.

(10) Patent No.: US 11,614,531 B2
(45) Date of Patent: Mar. 28, 2023

(54) CO-PRIME CODED (CPC) DOPPLER DIVISION MULTIPLEXING (DDM) MIMO RADAR METHOD AND SYSTEM

(71) Applicant: NXP USA, Inc., Austin, TX (US)

(72) Inventors: Ryan Haoyun Wu, San Jose, CA (US); Dongyin Ren, East Brunswick, NJ (US); Satish Ravindran, Santa Clara, CA (US)

(73) Assignee: NXP USA, Inc., Austin, TX (US)

( * ) Notice: Subject to any disclaimer, the term of this patent is extended or adjusted under 35 U.S.C. 154(b) by 126 days.

(21) Appl. No.: 17/109,317

(22) Filed: Dec. 2, 2020

(65) Prior Publication Data
US 2022/0171049 A1 Jun. 2, 2022

(51) Int. Cl.
| | | |
|---|---|---|
| *G01S 13/44* | (2006.01) | |
| *G01S 7/42* | (2006.01) | |
| *G01S 13/32* | (2006.01) | |
| *G01S 13/34* | (2006.01) | |

(Continued)

(52) U.S. Cl.
CPC .............. *G01S 13/449* (2013.01); *G01S 7/42* (2013.01); *G01S 13/325* (2013.01); *G01S 13/34* (2013.01); *G01S 13/582* (2013.01); *H04B 7/0413* (2013.01)

(58) Field of Classification Search
CPC ...... G01S 13/006; G01S 13/325; G01S 13/34; G01S 13/449; G01S 13/582; G01S 13/878; G01S 13/913; G01S 7/42
See application file for complete search history.

(56) References Cited

U.S. PATENT DOCUMENTS

| | | | |
|---|---|---|---|
| 2017/0131399 A1* | 5/2017 | Ioannidis | ............... H01Q 19/17 |
| 2018/0252809 A1* | 9/2018 | Davis | .................... G01S 7/0234 |
| 2020/0049812 A1 | 2/2020 | Jansen | |

FOREIGN PATENT DOCUMENTS

| | | |
|---|---|---|
| EP | 3105880 B1 | 2/2020 |
| EP | 3021132 B1 | 3/2020 |
| EP | 3671267 A1 | 6/2020 |

OTHER PUBLICATIONS

Feike Guss Jansen, Automotive Radar Doppler Division MIMO With Velocity Ambiguity Resolving Capabilities, Proceedings of the 16th European Radar Conference, pp. 245-248, Oct. 2-4, 2019.

(Continued)

*Primary Examiner* — Timothy A Brainard

(57) ABSTRACT

A co-prime coded DDM MIMO radar system, apparatus, architecture, and method are provided with a reference signal generator (112) that produces a transmit reference signal; a plurality of DDM transmit modules (11) that produce, condition, and transmit a plurality of transmit signals over which each have a different co-prime encoded progressive phase offset from the transmit reference signal; a receiver module (12) that receives a target return signal reflected from the plurality of transmit signals by a target and generates a digital signal from the target return signal; and a radar control processing unit (20) configured to detect Doppler spectrum peaks in the digital signal, where the radar control processing unit comprises a Doppler disambiguation module (25) that is configured with a CPC decoder to associate each detected Doppler spectrum peak with a corresponding DDM transmit module, thereby generating a plurality of transmitter-associated Doppler spectrum peak detections.

20 Claims, 11 Drawing Sheets

(51) Int. Cl.
    G01S 13/58    (2006.01)
    H04B 7/0413   (2017.01)

(56) References Cited

OTHER PUBLICATIONS

Fuyou Li et al., Blind Velocities Mitigation for DDMA MIMO GMTI Radar Via Multi-Frequency Signals, 19th International Radar Symposium IRS 2018, Jun. 20-22, 2018.

Daniel J. Rabideau, Doppler-Offset Waveforms for MIMO Radar, 2011 IEEE RadarCon (RADAR), Kansas City, MO, May 23-27, 2011, pp. 965-970.

Gonzalez Hector A et al.: "Doppler Ambiguity Resolution far Binary-Phase-Modulated MIMO FMCW Radars", 2019 International Radar Conference (RADAR), IEEE, Sep. 23, 2019, pp. 1-6, DOI: 10.1109/RADAR41533.2019.171412 [retrieved on Apr. 24, 2020].

Van Rossum Wim et al.: "Doppler ambiguity resolution using random slow-time code division multiple access MIMO radar with sparse signal processing", 2018 IEEE Radar Conference (RADARCONF18), IEEE, Apr. 23, 2018, pp. 441-446, DOI: 10.1109/RADAR.2018.8378599 [retrieved on Jun. 8, 2018].

\* cited by examiner

CO-PRIME CODED (CPC) DOPPLER DIVISION MULTIPLEXING (DDM) MIMO RADAR METHOD AND SYSTEM

BACKGROUND OF THE INVENTION

Field of the Invention

The present invention is directed in general to radar systems and associated methods of operation. In one aspect, the present invention relates to an automotive radar system formed with multiple-input, multiple-output (MIMO) radar arrays.

Description of the Related Art

Radar systems may be used to detect the range, velocity, and angle of nearby targets. With advances in technology, radar systems may now be applied in many different applications, such as automotive radar safety systems which increasingly use radar systems to detect changes to a surrounding environment, such as a proximity to another automobile for blind spot detection, or for detection of a leading vehicle for improved cruise control. Accurate radar detection is also integral to autonomous vehicle control systems. However, there are challenges with accurately detecting the position and movement of objects using radar systems that can be constructed on an automobile. A common method for improving the angular resolution of automotive radar systems uses multiple transmit and receive antennas to implement a Multiple-Input-Multiple-Output (MIMO) automotive radar system. In a MIMO radar system, a virtual array is formed with multiple array elements equal to a product of a number of transmit and receive antennas. The increased aperture of a MIMO RADAR compared to a single transmitter system increases the capability to separate objects based upon their Direction Of Arrival (DOA). However, the MIMO RADAR transmitter must transmit orthogonal waveforms from the multiple transmitters to separate the combined response on the receiver side.

Existing solutions for providing orthogonality include encoding the transmitted radar waveforms, such as by transmitting a Frequency Modulated Continuous Wave (FMCW) waveform at different time instants or different center frequencies, or by changing a phase or amplitude of the FMCW waveform. In traditional automotive radar systems, the maximum Doppler frequency is typically not sufficient to prevent velocity ambiguity that car arise with overlapped Doppler spectrums from multiple transmit antennas in a Doppler Division Multiplexing (DDM) MIMO automotive radar system particularly. The ambiguity that arises with DDM MIMO systems is that each detected Doppler spectrum peak must be correctly associated with its corresponding illumination transmitter, but if the target's radial speed exceeds the budgeted maximum speed allocated to a transmitter, the spectrum peak will show up in a spectrum section allocated to another transmitter, resulting in incorrect association. The problem worsens for a system servicing a highly dynamic drive scene with many transmitters and limited Doppler spectrum bandwidth.

Existing radar systems have attempted to address these challenges by obtaining two measurements per FMCW waveform having both an "up-chirp" with increasing frequency and a "down-chirp" with decreasing frequency, but such solutions are unduly complicated because the up-chirp and down-chirp need to be associated with each other for radar processing. Other solutions have used time-division (TD) multiplexing techniques to separate LFM waveforms from different transmitters in time, thereby separating signals originated from distinct transmitters at each receiving channel for constructing a virtual MIMO array. However, because the coherent dwell time (i.e., the time duration an echo signal of a target can be coherently integrated on a moving target) is usually limited, the number of transmitters that can be used with TD-MIMO systems is limited. Another drawback with conventional TD-MIMO systems is that longer frame or chirp sequence durations may lead to multiple-times decrease in the maximum Doppler shift (or effectively, radial velocity of a target) that can be measured without ambiguity, again limiting the number of transmitters that may be used for TD-MIMO systems. As a result of these constraints, existing MIMO automotive radar systems are typically limited to using a small number of transmitters (e.g., 3) to construct a relatively small MIMO virtual array. As seen from the foregoing, the existing radar system solutions are extremely difficult at a practical level by virtue of the challenges with achieving the performance benefits of larger size radars to achieve higher resolution radar imaging within the performance, design, complexity and cost constraints of existing radar system applications.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

Figure 1:
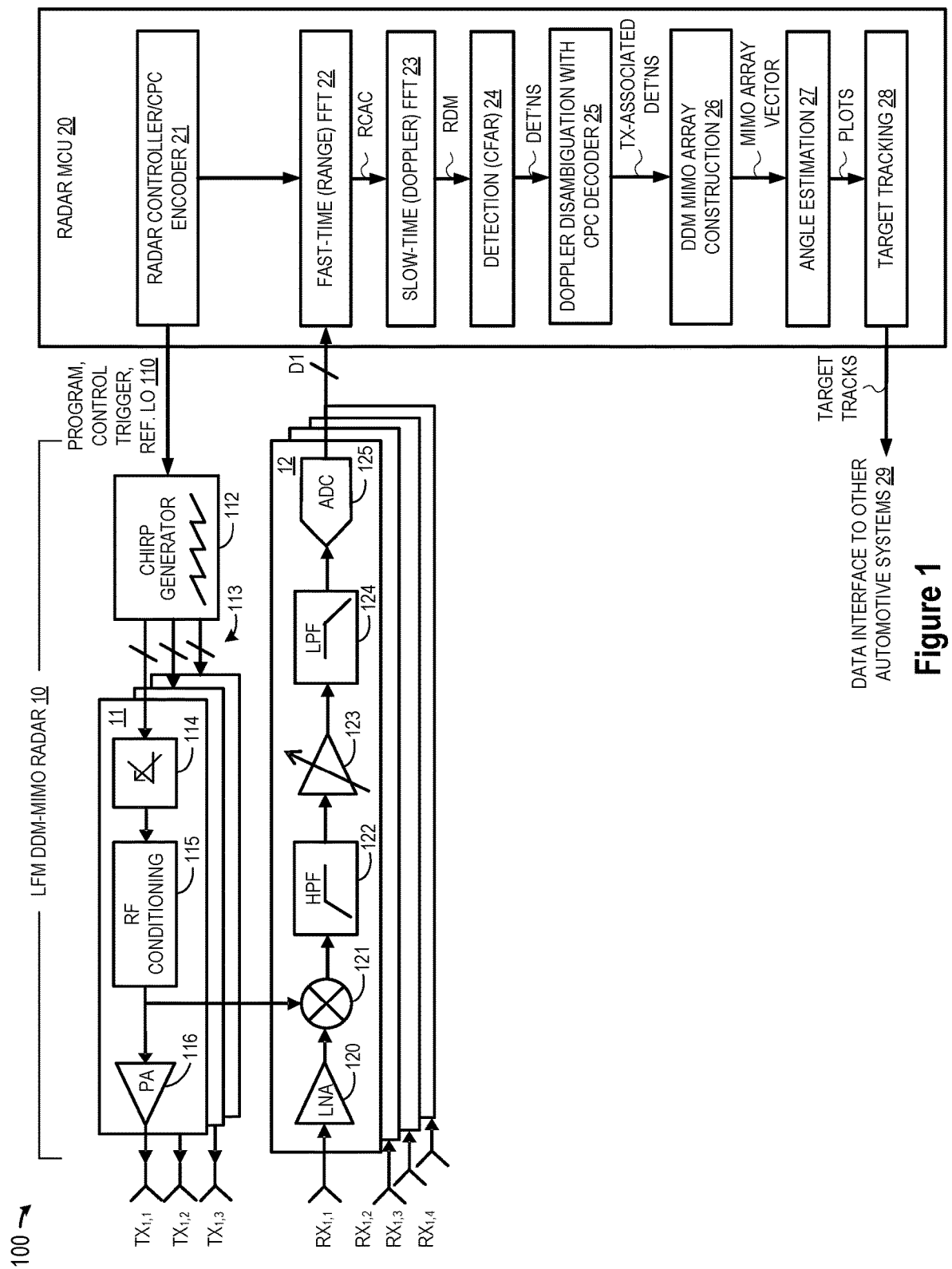
FIG. 1 is a simplified schematic block diagram of a linear chirp DDM MIMO radar system in accordance with selected embodiments of the present disclosure.

A co-prime coded (CPC) Doppler Division Multiplexing (DDM) MIMO radar system, hardware circuit, system, architecture, and methodology are described for disambiguating overlapped Doppler spectrums from multiple transmitters by encoding a Doppler division MIMO waveform using co-prime based zero-radial velocity frequency spacing to allow robust and unambiguous reconstruction of individual transmitters Doppler spectrum detections. In selected embodiments, CPC encoding is implemented in separate LFM DDM MIMO transmitters by using a programmable phase rotator in each transmit channel to implement progressive phase coding in slow time (i.e., chirp time) so that spacing values (between two adjacent zero-radial velocity Doppler bins, in number of bins) are consistent with co-prime number values. By applying a progressive phase shift over the chirp signal so that the amount of progression between transmitters uses co-prime based values, each transmit signal has a different co-prime encoded phase offset from the transmit reference signal. As a result, the slow-time derivative of the slow-time phase variation (i.e., the slope of the progressive phase variation function or linear phase curve over chirp times) is the amount of Doppler frequency shift created by the phase coding. By controlling the slope (amount of progression), the placement of the zero-radial velocity on the Doppler spectrum for a transmitter can be controlled. With each transmit channel transmitting a different CPC encoded LFM signal, the receiver can use a CPC decoder to associate the Doppler peak to its corresponding transmitter by matching the peak appearances in the Doppler spectrum to each transmitter's unique peak appearance location code in a decoding vector, thereby disambiguating DDM MIMO waveforms. In selected embodiments, the receive signal processing steps may include FIR filtering for direct separation of Doppler spectrum peaks for individual transmitters by defining CPC decoding vectors, detecting Doppler peaks, and performing CPC decoding by performing threshold detection on the Doppler spectrum of the received radar signal and producing a binary sequence of the length of Doppler spectrum samples and with '1's only at the entries corresponding to the detected cells. In addition, a variance check process may be applied to further reduce false associations by evaluating the variance of filter-matched spectrum samples against a predefined threshold so that an association is marked as true if the variance is at or below a predefined threshold. With this approach, additional transmitters can share the limited Doppler spectrum that is available from the maximum achievable pulse repetition frequency (PRF) rate in a fast linear chirp radar system, thereby enabling the construction of a larger MIMO virtual array and higher angular resolution performance. As a result, Doppler spectrum signals of different transmitters can effectively be separated in a single transmission frame when individual transmitters' spectrums are heavily overlapped with each other. By providing hardware and software solutions for using co-prime coding and decoding to disambiguate overlapped Doppler spectrums of multiple transmitters, the disclosed LFM DDM MIMO radar system and methodology efficiently provide a MIMO virtual array having an aperture that is many times larger than the total physical apertures combined, thereby achieving better sensitivity, finer angular resolution, and low false detection rate.

In the context of the present disclosure, it will be appreciated that radar systems may be used as sensors in a variety of different applications, including but not limited to automotive radar sensors for road safety systems, such as advanced driver-assistance systems (ADAS) and autonomous driving (AD) systems. In such applications, the radar systems are used to measure the radial distance to a reflecting object, its relative radial velocity, and angle information, and are characterized by performance criteria, such as the angular resolution (the minimum distance between two targets of given sizes at the same range and range rate (or radial velocity) resolution cell which a radar is able to distinguish and separate to each other), sensitivity, false detection rate, and the like. Typically, frequency modulated continuous wave (FMCW) modulation radars are used to identify the distance, velocity, and/or angle of a radar target, such as a car or pedestrian, by transmitting Linear Frequency Modulation (LFM) waveforms from multiple transmit antennas so that reflected signals from the radar target are received at multiple receive antennas and processed to determine the radial distance, relative radial velocity, and angle (or direction) for the radar target. However, with current automotive designs, a vehicle can include multiple radar transmitters which can operate independently from one another. While there are different coding domains (time, frequency, and code) available for differentiating individual transmitters, selected embodiments of the present disclosure are directed to LFM waveform transceivers that are configured to implement Doppler division multiplexing (DDM) MIMO operations by having each transmitter emit an identical frequency ramp chirp signal with specified phase offset values encoded onto individual chirps of the entire chirp sequence to spectrally separate signals originated from distinct transmitters in the Doppler domain so that a receiving channel can distinctly detect each signal and thereby construct a virtual MIMO array.

For a contextual understanding of the design and operation of a DDM MIMO radar system, reference is now made to FIG. 1 which depicts a simplified schematic block diagram of a linear chirp DDM-MIMO automotive radar system 100 which includes an LFM DDM-MIMO radar device 10 connected to a radar microcontroller unit (MCU) 20. In selected embodiments, the LFM DDM-MIMO radar device 10 may be embodied as a line-replaceable unit (LRU) or modular component that is designed to be replaced quickly at an operating location. Similarly, the radar MCU 20 may be embodied as a line-replaceable unit (LRU) or modular component. Although a single or mono-static LFM DDM-MIMO radar device 10 is shown, it will be appreciated that additional distributed radar devices may be used to form a distributed or multi-static radar. In addition, the depicted radar system 100 may be implemented in integrated circuit form with the LFM DDM-MIMO radar device 10 and the radar MCU 20 formed with separate integrated circuits (chips) or with a single chip, depending on the application.

Each radar device 10 includes one or more transmitting antenna elements $TX_i$ and receiving antenna elements $RX_j$ connected, respectively, to one or more radio-frequency (RF) transmitter (TX) units 11 and receiver (RX) units 12. For example, each radar device (e.g., 10) is shown as including individual antenna elements (e.g., $TX_{1,i}$, $RX_{1,j}$) connected, respectively, to three transmitter modules (e.g., 11) and four receiver modules (e.g., 12), but these numbers are not limiting and other numbers are also possible, such as four transmitter modules 11 and six receiver modules 12, or a single transmitter module 11 and/or a single receiver modules 12. Each radar device 10 also includes a chirp generator 112 which is configured and connected to supply a chirp input signal to the transmitter modules 11. To this end, the chirp generator 112 is connected to receive input program and control signals 110, including a reference local oscillator (LO) signal, a chirp start trigger signal, and program control signals. Chirp signals 113 are generated and transmitted to multiple transmitters 11, where phase coding is applied using a phase rotator 114 that is controlled by the program control signals 110 generated by the MCU 20. While the phase shifters 114 may provide a uniform phase shift between transmitters 11, the programmable phase rotator 114 also provides each transmitter 11 with the ability to implement progressive phase shifting using a non-uniform coding technique, such as the CPC coding technique described more fully hereinbelow. At each transmitter 11, the phase coded chirp signals are then filtered at the RF conditioning module 115 and amplified at the power amplifier 116 before being fed to the corresponding transmit antenna $TX_{1,i}$ and radiated. By using each transmit antenna $TX_{1,i}$ to transmit progressively phase shifted sequence of chirp signals, each transmitter element 11 operates in a Doppler division multiplexing fashion with other transmitter elements because they are programmed to simultaneously transmit identical waveforms on a phase separated schedule.

The radar signal transmitted by the transmitter antenna unit $TX_{1,i}$, $TX_{2,i}$ may by reflected by an object, and part of the reflected radar signal reaches the receiver antenna units $RX_{1,i}$ at the radar device 10. At each receiver module 12, the received (radio frequency) antenna signal is amplified by a low noise amplifier (LNA) 120 and then fed to a mixer 121 where it is mixed with the transmitted chirp signal generated by the RF conditioning unit 115. The resulting intermediate frequency signal is fed to a first high-pass filter (HPF) 122. The resulting filtered signal is fed to a first variable gain amplifier 123 which amplifies the signal before feeding it to a first low pass filter (LPF) 124. This re-filtered signal is fed to an analog/digital converter (ADC) 125 and is output by each receiver module 12 as a digital signal D1. In this way, the receiver modules 12 compress target echo of various delays into multiple sinusoidal tones whose frequencies correspond to the round-trip delay of the echo.

In the radar system 100, the radar MCU 20 may be connected and configured to supply input control signals 110 to the radar device 10 and to receive therefrom digital output signals D1 generated by the receiver modules 12. In selected embodiments, the radar MCU 20 includes a radar controller processing unit 21 that may be embodied as a microcontroller unit (MCU) or other processing unit that is configured and arranged for signal processing tasks such as, but not limited to, target identification, computation of target distance, target velocity, and target direction, and generating control signals.

To control the transmit modules 11, the radar controller processing unit 21 may, for example, be configured to generate transmitter input signals 110, such as program, control trigger, reference LO signal(s), calibration signals, frequency spectrum shaping signals (such as ramp generation in the case of FMCW radar), and to receive data signals, sensor signals, and/or register programming or state machine signals for RF (radio frequency) circuit enablement sequences. In particular, the radar controller processor 21 may be configured to program the transmit modules 11 with transmitter input signals 110 to operate in a DDM fashion by progressively phase shifting and transmitting LFM chirps for communication between the transmit antennas $TX_{1,i}$, $RX_{1,j}$. In selected embodiments, the radar controller processor 21 is configured to progressively phase shift the LFM chirps 113 with CPC encoding by programming the programmable phase rotator 114 prior to transmission. With each transmit module 11 emitting a transmit channel signal having a different CPC encoded LFM signal that is generated with a programmable slow-time phase shifter 114, the receiver module 12 can condition the target return signals to generate digital domain signals D1 which are processed by the radar MCU 20 to separate and identify the CPC-encoded transmit channel signals.

At the receiver module, the digital output signals D1 are generated from the target return signals for digital processing by the radar modules 22-26 to construct and accumulate multiple-input multiple-output (MIMO) array vector outputs forming a MIMO aperture for use in computing the plots generated by the angle estimation (e.g., a spatial or angle FFT) module 27 and target tracks generated by the target tracking module 28. In particular, the digital output signals D1 may be processed by one or more fast Fourier transform (FFT) modules, such as a fast-time (range) FFT module 22 which generates a range chirp antenna cube (RCAC) and a slow-time (Doppler) FFT module 23 which generates a range-Doppler antenna cube or map (RDM). In turn, the RDM outputs are then passed through one or more detection modules 24, such as a Constant False Alarm Rate (CFAR) detection module, to obtain the range-Doppler peak detections (DET'NS). As described more fully hereinbelow, the range-Doppler peak detections may be processed by the Doppler disambiguation module 25 to generate transmitter-associated detections (TX-ASSOCIATED DET'NS) by using a CPC decoder to associate Doppler peaks and corresponding transmitters to match the peak appearances in the Doppler spectrum to each transmitter's unique peak appearance location code, thereby disambiguating DDM MIMO waveforms. The transmitter-associated detection peaks may be further processed at the spatial angle estimation module 27 and target tracking module 28, with the resulting target tracks being output 29 to other automotive computing or user interfacing devices for further process or display.

In selected embodiments, the Doppler disambiguation module 25 is configured to construct or access, for each transmitter, a binary FIR filter with tap delays following a unique co-prime spacing sequence associated with the transmitter, and then performing threshold detection on the Doppler spectrum of the received radar signal to produce a binary sequence of the length of Doppler spectrum samples and with '1's only at the entries corresponding to the detected cells. By filtering the formed binary detection sequence with each of the transmitter filters, the spectrum peaks are associated to a transmitter if corresponding filter outputs exceed a predefined threshold. And for improved performance in a dense target environment, each association is analyzed by evaluating the variance of the Doppler Spectrum samples that match the tap delay positions to confirm the association if the variance is no greater than a predefined threshold. Once the Doppler peaks are correctly associated with the originating transmitter module 11, For a contextual understanding of the operation of a conventional DDM MIMO radar system, reference is now made to FIG. 2 which is a timing diagram illustration 200 of the linear chirp transmission schedules of four transmitters 201-204 using a uniform Doppler division scheme. As depicted, each transmitter $TX_1$-$TX_4$ is programmed to simultaneously transmit a sequence of DDM linear chirp waveforms 201-204 in a single radar transmission frame. Each transmitter (e.g., $TX_1$) is transmitting a linear chirp waveform (e.g., 201A, 201B) at a fixed and uniform pulse repetition frequency (PRF) rate which is the inverse of the pulse repetition interval (e.g., $PRF=PRI^{-1}$) or chirp interval time (e.g., $PRF=CIT^{-1}$). In addition, each transmitter encodes each chirp with an additional progressive phase offset by using the phase rotator in the front-end circuit. As a result of the progressive phase offset coding, each of the received chirps originating from each distinct transmitter $TX_1$-$TX_4$ effectively has a distinct zero-radial velocity Doppler shift and the individual target detections can be associated with correct originating transmitter which is necessary for the correct functioning of the subsequent MIMO virtual array construction.

The location of the zero-radial velocity is controlled by the progressive phase offset applied to each transmitter's chirp based on the following equation:

$$f_{zrv,i} = \frac{A_i}{2\pi} PRF \; [\text{Hz}],$$

where $f_{zrv,i}$ is the zero-radial velocity Doppler shift frequency of transmitter-i, and where $A_i$ is the progressive phase shift (radians) between two adjacent chirps. For example, in a 4-TX DDM MIMO system, each transmitter could be assigned the following progressive phase offsets and thus the zero-radial velocity frequencies:

$$TX_1 : A_1 = 0 \rightarrow f_{zrv,1} = 0 \; [\text{Hz}]$$
$$TX_2 : A_2 = \frac{\pi}{2} \rightarrow f_{zrv,2} = \frac{PRF}{4} \; [\text{Hz}]$$
$$TX_3 : A_3 = \pi \rightarrow f_{zrv,3} = \frac{PRF}{2} \; [\text{Hz}]$$
$$TX_4 : A_4 = \frac{3\pi}{2} \rightarrow f_{zrv,4} = \frac{3*PRF}{4} \; [\text{Hz}].$$

Figure 2:
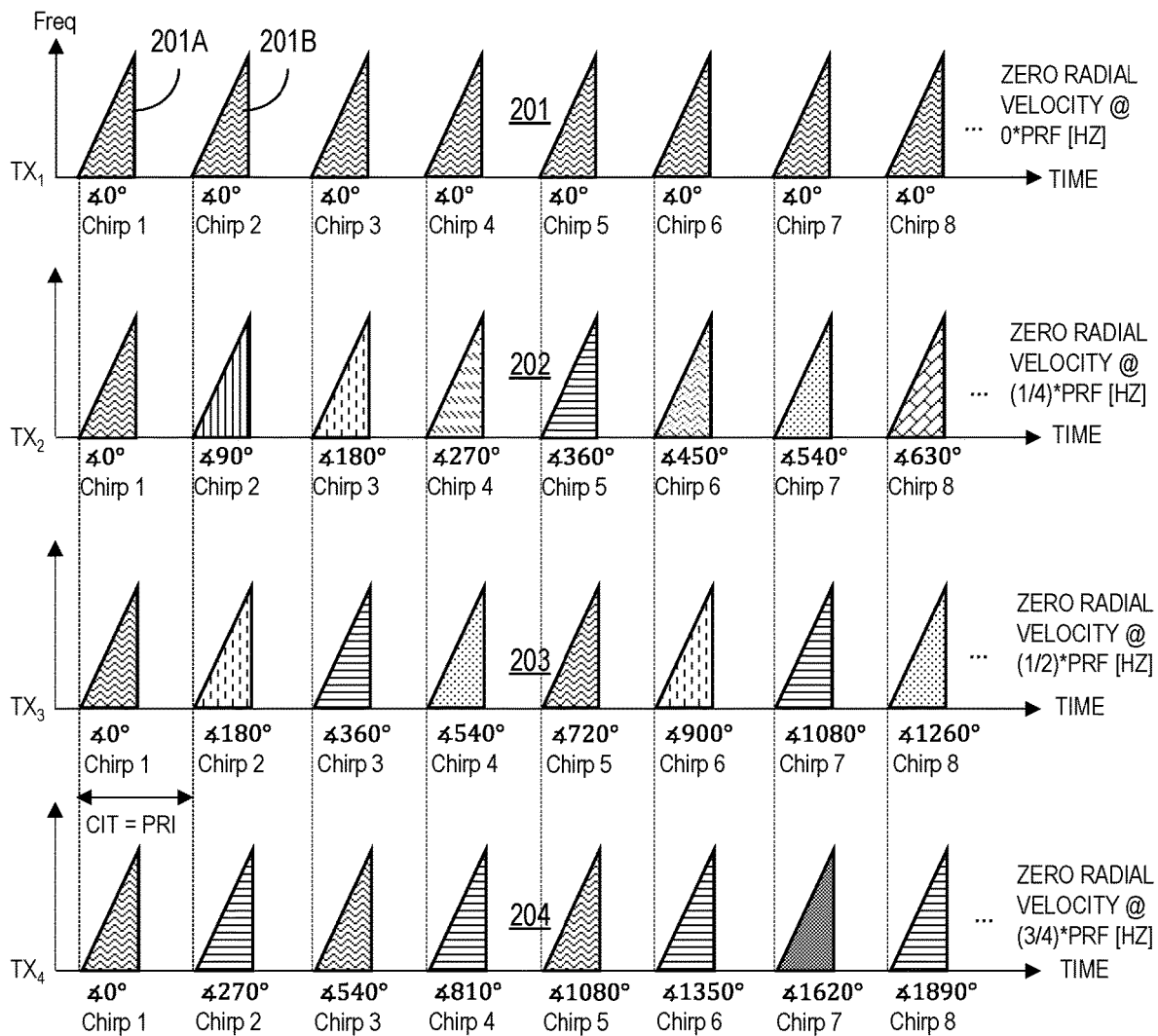
FIG. 2 is a timing diagram illustrating a linear chirp transmission schedule for a uniform DDM MIMO radar system.

In the example of FIG. 2, this result is depicted with the first transmitter $TX_1$ encoding its chirp waveforms 201 with a progressive phase offset of 0 degrees, the second transmitter $TX_2$ encoding its chirp waveforms 202 with a progressive phase offset of 90 degrees, the third transmitter $TX_3$ encoding its chirp waveforms 203 with a progressive phase offset of 180 degrees, and the fourth transmitter $TX_4$ encoding its chirp waveforms 204 with a progressive phase offset of 270 degrees. In such a DDM MIMO radar system which uses uniform Doppler division, targets can be unambiguously associated to the correct transmitter by judging its location within the sectorized Doppler spectrum, provided that the targets have true Doppler shifts within $\pm PRF/(2N)$ before applying DDM, where N is the number of DDM transmitters.

Figure 3:
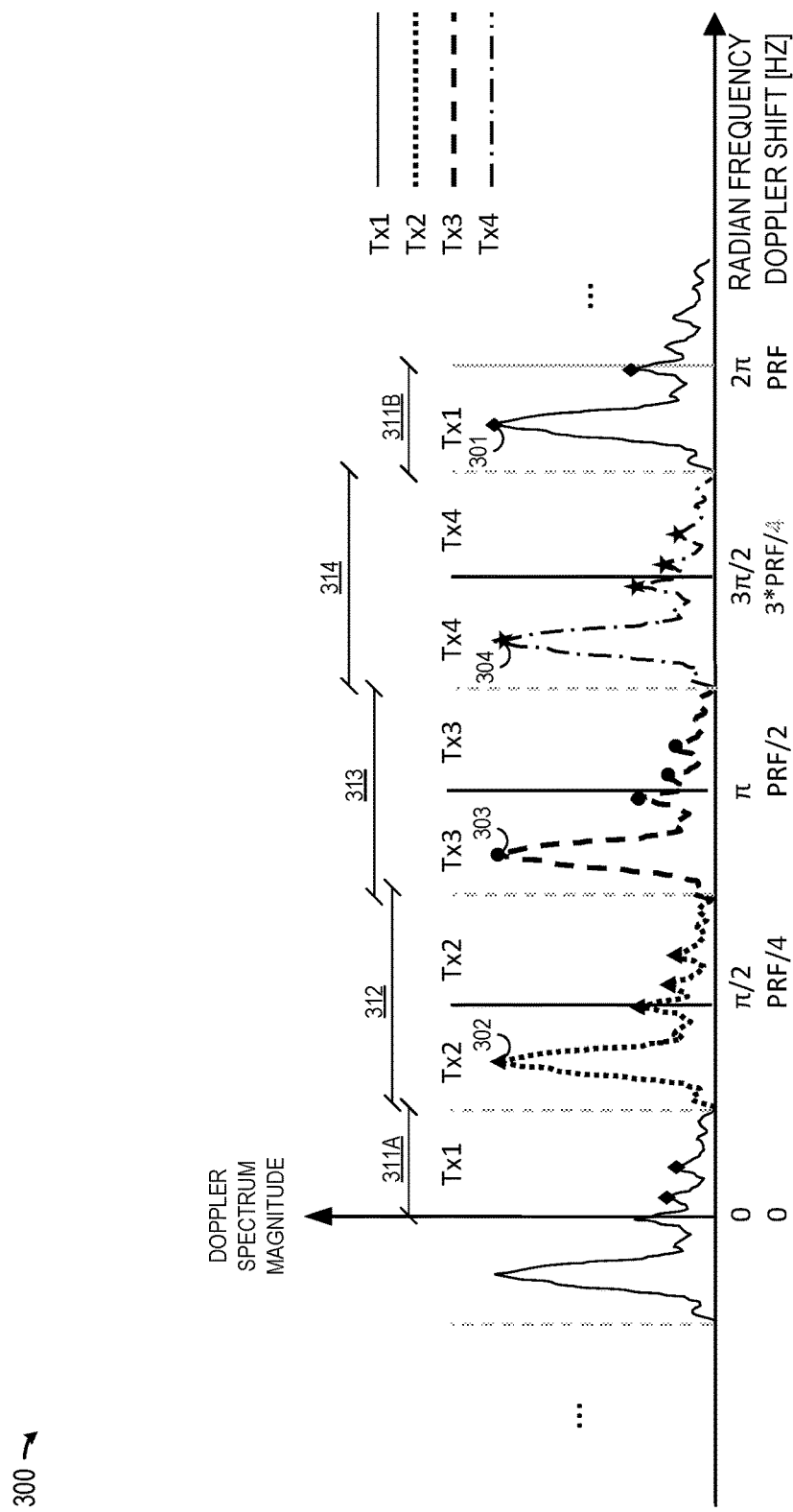
FIG. 3 is a plot of a Doppler spectrum for a uniform DDM MIMO radar system where the maximum radial velocity of the targets does not exceed the allocated spectrum budget, resulting in unambiguous association of target peaks and transmit antenna.

To illustrate the principle of Doppler-peak detection and transmitter association, reference is now made to FIG. 3 which depicts a plot 300 of the Doppler spectrum as a function of the radian frequency (and Doppler shift) for a uniform DDM MIMO radar system where the maximum radial velocity of the targets does not exceed the allocated spectrum budget, resulting in unambiguous association of target peaks and transmit antenna. As depicted, each transmitter $TX_1$-$TX_4$ has an allocated spectrum section 311-314 which is effectively centered around a corresponding zero-radial velocity frequency (e.g., 0, $\pi/2$, $\pi$, and $3\pi/2$). As a result, each target measurement 301-304 having a true Doppler shift within $\pm PRF/(2N)$ of the zero-radial velocity frequency for each transmitter $TX_1$-$TX_4$ can be unambiguously associated to the correct transmitter by judging its location within the sectorized Doppler spectrum 300. This result holds true for long as the target's radial speed falls within the allocated spectral budget sections 311-314 for each transmitter $TX_1$-$TX_4$.

With existing 76-81 GHz fast-chirp automotive radar front-end monolithic microwave integrated circuits (MMICs), the fastest chirp signals are limited by a Chirp Interval Time (CIT) that is no shorter than a period of approximately 15 microseconds. As a result, the maximum unambiguous Doppler radial detection speed is ±65 m/s (or ±234 km/hr), and the entire extent of detectable speed is then divided into N sections for N transmitters for unambiguous DDM operation. As can be clearly seen, in a high dynamic drive scene where targets and radar travels at 100 km/hr speed or faster, the extent of the roughly 470 km/hr Doppler spectrum bandwidth is sufficient only for very few transmitters. While more transmitters could be supported without incurring ambiguity by significantly shortening the CIT to a period on the order of microseconds, such ultra-short chirps provide additional cost and complexity to the radar systems. In lieu of a radar system that supports ultra-short chirps or larger spectral budget allocations, ambiguities will occur in the DDM Doppler spectrum when a target's radial speed exceeds its allocated spectral budget, causing the spectrum peak from a first transmitter to show up in a section allocated to another transmitter such that incorrect association occurs.

Figure 4:
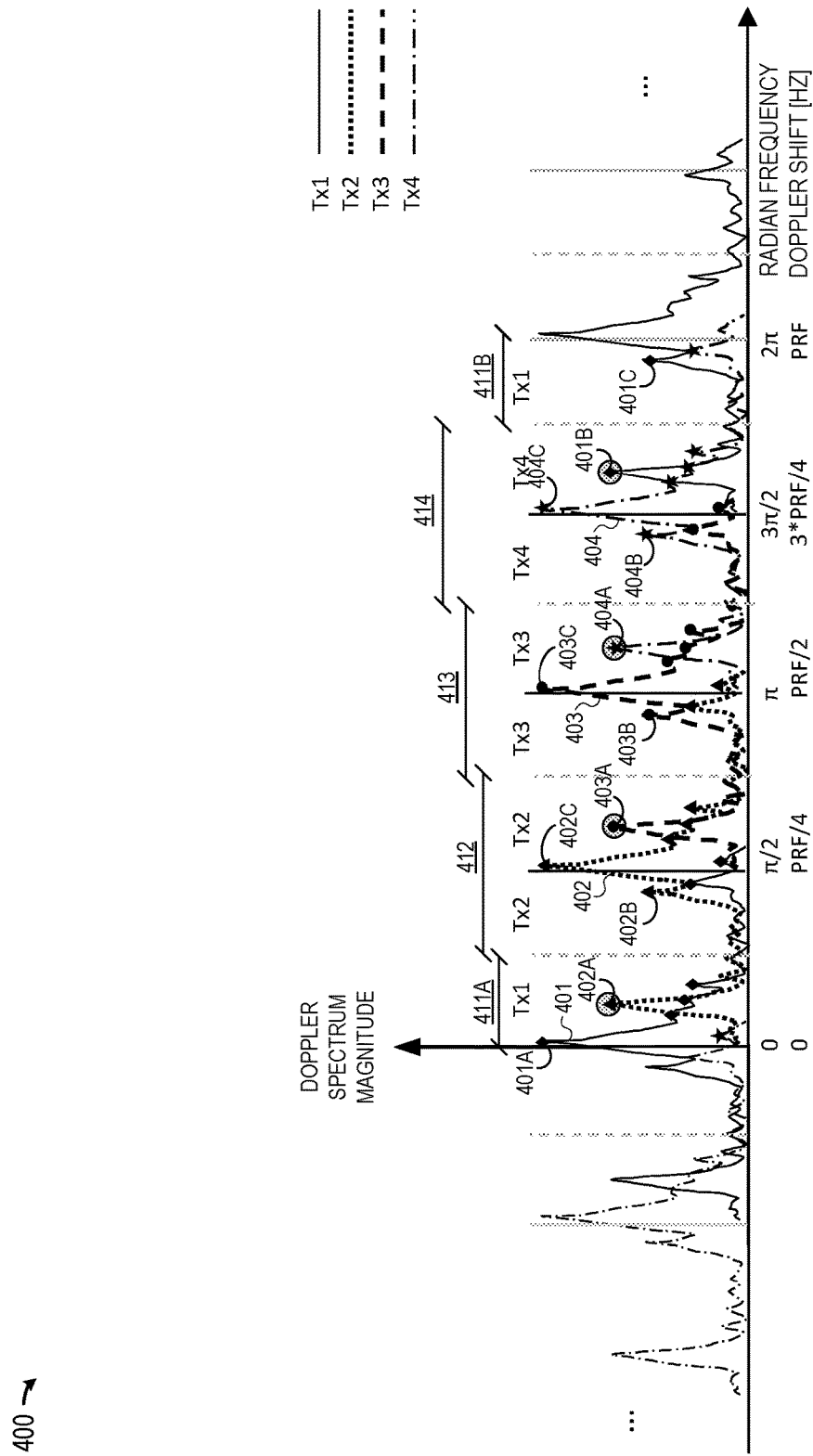
FIG. 4 is a plot of a Doppler spectrum for a uniform DDM MIMO radar system where the maximum radial velocity of the targets exceeds the allocated spectrum budget, resulting in ambiguous association of target peaks and transmit antenna.

To illustrate how the associations between transmitter and spectrum peaks can fail, reference is now made to FIG. 4 which depicts a plot 400 of the Doppler spectrum as a function of the radian frequency or Doppler shift for a uniform DDM MIMO radar system where the maximum radial velocity of the targets exceeds the allocated spectrum budget, resulting in ambiguous association of target peaks and transmit antenna. The contribution to the CPC Doppler spectrum 400 from each transmitter is indicated with the solid line 401 (for $TX_1$), the dotted line 402 (for $TX_2$), the dashed line 403 (for $TX_3$), and the dashed-dotted line 604 (for $TX_4$) As depicted, each transmitter $TX_1$-$TX_4$ has an allocated spectrum section 411-414 which is effectively centered around a corresponding zero-radial velocity frequency (e.g., 0, $\pi/2$, $\pi$, and $3\pi/2$). However, the detections 401-404 of the transmitters $TX_1$-$TX_4$ encroach upon the allocated spectrum sections of different transmitter such that they cannot be unambiguously associated. In particular, the detections 401A, 401C for the first transmitter $TX_1$ are present in the allocated spectrum 411A, 411B of the first transmitter $TX_1$, but one or more additional detections (e.g., 401B, circled in gray) for the first transmitter $TX_1$ are present in a different transmitter's allocated (e.g., spectrum 414 for the fourth transmitter $TX_4$). In addition, the detections 402B, 402C for the second transmitter $TX_2$ are present in the allocated spectrum 412 of the second transmitter $TX_2$, but one or more additional detections (e.g., detection 402A, circled in gray) for the second transmitter $TX_2$ are present in a different transmitter's allocated spectrum (e.g., spectrum 411 for the first transmitter $TX_1$). Likewise, the detections 403B, 403C for the third transmitter $TX_3$ are present in the allocated spectrum 413 of the third transmitter $TX_3$, but one or more additional detections (e.g., detection 403A, circled in gray) for the third transmitter $TX_3$ are present in a different transmitter's allocated spectrum (e.g., spectrum 412 for the second transmitter $TX_2$). Finally, the detections 404B, 404C for the fourth transmitter $TX_4$ are present in the allocated spectrum 414 of the fourth transmitter $TX_4$, but one or more additional detections (e.g., detection 404A, circled in gray) for the fourth transmitter $TX_4$ are present in a different transmitter's allocated spectrum (e.g., spectrum 413 for the third transmitter $TX_3$).

With the encroachments of transistor peak detections into other transistor's allocated spectrum, the resulting errors in associating detections with transmitters makes it impossible to construct a MIMO virtual array output without correcting the associations. As a result, a method is needed to disambiguate overlapped Doppler spectrums of DDM transmitters.

Figure 5:
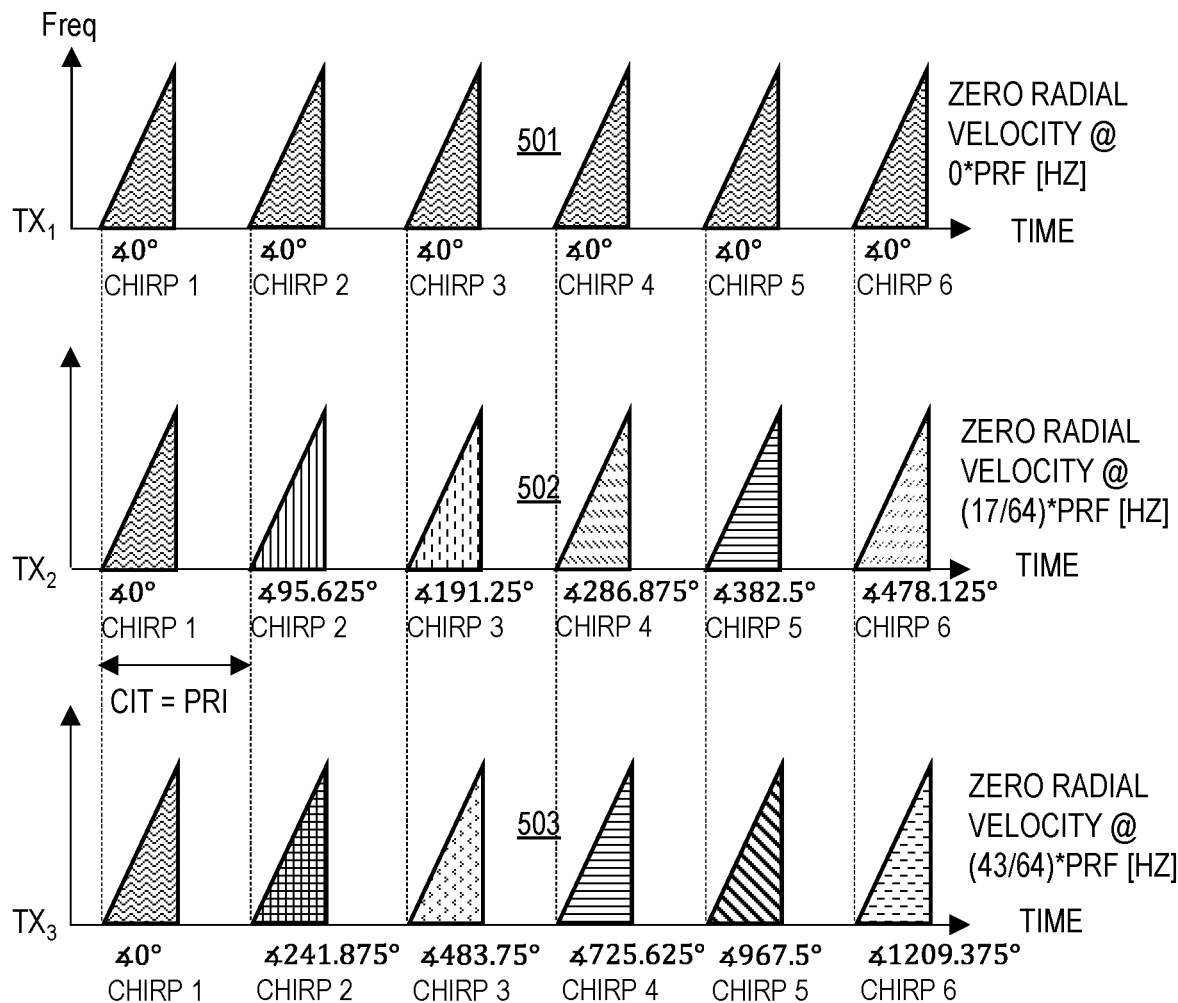
FIG. 5 is a timing diagram illustrating a linear chirp transmission schedule for a DDM MIMO radar system using a non-uniform Doppler division scheme which employs a co-prime coding in accordance with selected embodiments of the present disclosure.

To address these limitations from conventional solutions and others known to those skilled in the art, reference is now made to FIG. 5 which is a timing diagram illustration 500 of a linear chirp transmission schedule for a DDM MIMO radar system having three transmitters 501-503 using a non-uniform Doppler division scheme which employs a co-prime coding in accordance with selected embodiments of the present disclosure. As depicted, each transmitter $TX_1$-$TX_3$ is programmed to simultaneously transmit a sequence of DDM linear chirp waveforms 501-503 having a fixed and uniform pulse repetition frequency (PRF) rate which is the inverse of the pulse repetition interval (e.g., PRF=$PRI^{-1}$) or chirp interval time (e.g., PRF=$CIT^{-1}$). Prior to transmission, each chirp is encoded with an additional progressive phase shift using the CPC encoding technique disclosed herein by using a programmable phase rotator in the front-end circuit. By using progressive phase offset CPC coding, the Doppler spectrum for the transmitters $TX_1$-$TX_3$ is effectively portioned following the co-prime number theory principle so that Doppler spectrum signals of different transmitters can be separated in a single transmission frame when individual transmitters' spectrums are heavily overlapped with each other. By encoding the DDM MIMO waveforms using co-prime based zero-radial velocity frequency spacing, individual transmitter Doppler spectrum detections can be robustly and unambiguously reconstructed to association with the correct transmitter, thereby enabling more transmitters to share the limited Doppler spectrum which is constrained by the maximum achievable PRF. As a result, each of the received chirps originating from each distinct transmitter $TX_1$-$TX_3$ effectively has a distinct zero-radial velocity Doppler shift and the individual target detections can be associated with correct originating transmitter which is necessary for the correct functioning of the subsequent MIMO virtual array construction.

In the example of FIG. 5, the differentiated CPC coding scheme is depicted with the first transmitter $TX_1$ encoding its chirp waveforms 501 with a progressive phase offset of 0 degrees, the second transmitter $TX_2$ encoding its chirp waveforms 502 with a progressive phase offset of $17/64 \times$ PRF=95.625 degrees, and the third transmitter $TX_3$ encoding its chirp waveforms 503 with a progressive phase offset of $43/64 \times$PRF=241.875 degrees. As a result, the first transmitter $TX_1$ has an allocated spectrum section centered around $0 \times$PRF=0 degrees for zero radial velocity detections from the first transmitter $TX_1$. In addition, the second transmitter $TX_2$ has an allocated spectrum section centered around $17/64 \times$PRF=95.625 degrees for zero radial velocity detections from the second transmitter $TX_2$. Finally, the third transmitter $TX_3$ has an allocated spectrum section centered around $43/64 \times$PRF=241.875 degrees for zero radial velocity detections from the third transmitter $TX_3$. By encoding the individual DDM transmitters $TX_1$-$TX_3$ using co-prime based zero-radial velocity frequency spacing, the received Doppler Division MIMO waveform may be processed with CPC decoding to correctly associate individual transmitter Doppler spectrum detections with the correct transmitter. As will be noted, the arrangement of the zero-radial velocity resulting in spacing values of $\{17, 26, 21\}$ are co-primes in PRF/64 [Hz] units.

Figure 6:
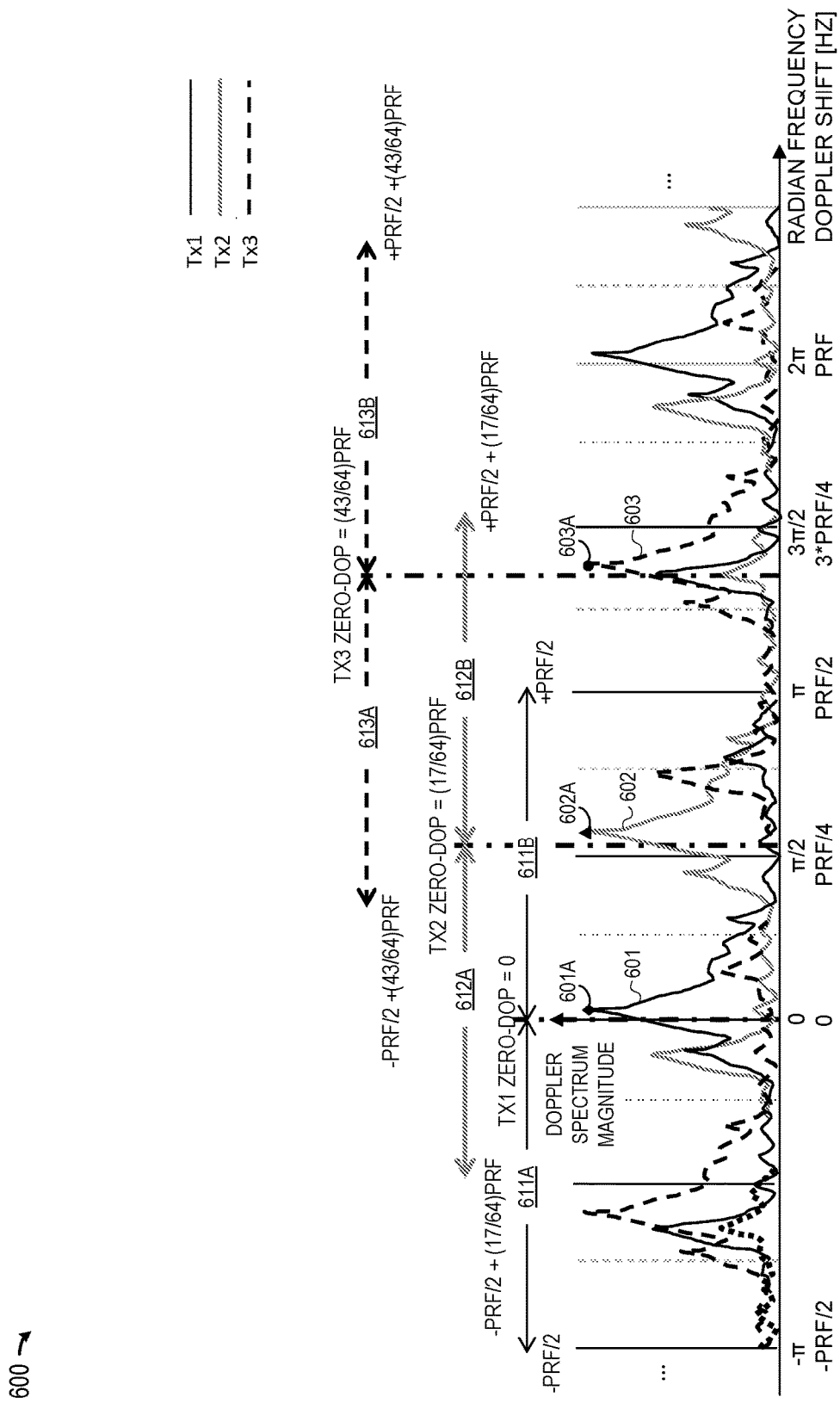
FIG. 6 is a plot of a CPC Doppler spectrum for a non-uniform DDM MIMO radar system where detection peaks at each receiver can be assigned to each transmitter using CPC decoding techniques even in the presence of overlap between the spectrums for different transmitters.

For an improved understanding of selected embodiments of the present disclosure, reference is now made to FIG. 6 which depicts a plot of a CPC Doppler spectrum 600 for a non-uniform DDM MIMO radar system having detection peaks from three transmitters $TX_1$-$TX_3$ that the receiver can correctly assign to or associate with the corresponding transmitter using CPC decoding techniques, even in the presence of overlap between the spectrums for different transmitters. The contribution to the CPC Doppler spectrum 600 from each transmitter is indicated with the solid line 601 (for $TX_1$), the gray line 602 (for $TX_2$), and the dashed line 603 (for $TX_3$). In this case, each transmitter $TX_1$-$TX_3$ has an allocated spectrum 611-613 of the size of full-PRF extent in Hz (or a in radians), each of which is centered around a corresponding zero-radial velocity frequency (e.g., 0, $2\pi \times$ ($17/64$), and $2\pi \times (43/64)$). With this arrangement of the CPC Doppler spectrum 600 and the disclosed decoding method, the receiver can associate the peak detection 601A in the first transmitter's spectrum 611A/B with the first transmitter $TX_1$. In addition, the receiver can associate the peak detection 602A in the second transmitter's spectrum 612A/B with the second transmitter $TX_2$, and the receiver can associate the peak detection 603A in the third transmitter's spectrum 613A/B with the third transmitter $TX_3$.

As seen from the example shown in FIG. 6 and described hereinbelow with reference to FIGS. 9-11, the use of co-prime spacing or quasi-prime spacing between the zero-velocity points of transmitters on the Doppler spectrum 600 prevents the peak detections 601A-603A from being associated with incorrect transmitters, even when the spectrum are overlapped, thereby enabling unambiguous association of each detected peak with the corresponding transmitter. At the receiver, this Doppler spectrum arrangement can be physically detected by observing the phase shifts applied to each transmitted chirp of individual transmitters, by the offset of the center frequency of an entire transmitted frame of a transmitter using a spectrum analyzer, or by the Doppler spectrum producible for each range cell's output over the slow-time. In selected embodiments, the radar receiver may be configured to perform distinct signal processing steps which apply FIR filtering to the received radar signal waveforms to separate the Doppler spectrum peaks for individual transmitters, thereby eliminating any complicated if/then dynamic decision-making logic operations. In addition, digital processing steps at the radar receiver may provide an additional sanity check by evaluating the variance of filter-matched spectrum samples to further reduce the false association rate. With the disclosed FIR filtering approach, the received Doppler spectrum signals of different transmitters can be effectively separated and associated with the corresponding transmitter in a single radar transmission frame, even when individual transmitter spectrums are heavily overlapped with each other (up to the full $2\pi$ extent). This represents an improvement over convention methods which require multiple frames and complex decision logic to complete any disambiguation task. In addition, the performance of the disclosed FIR filtering approach scales with the number of transmitters as the filter length grows linearly with the number of transmitters. Indeed, a longer FIR filter has better discriminatory capability to compensate for the effect of a more crowded spectrum, in contrast to conventional approaches which are not scalable and which have degraded performance as the number of transmitters increases.

Figure 7:
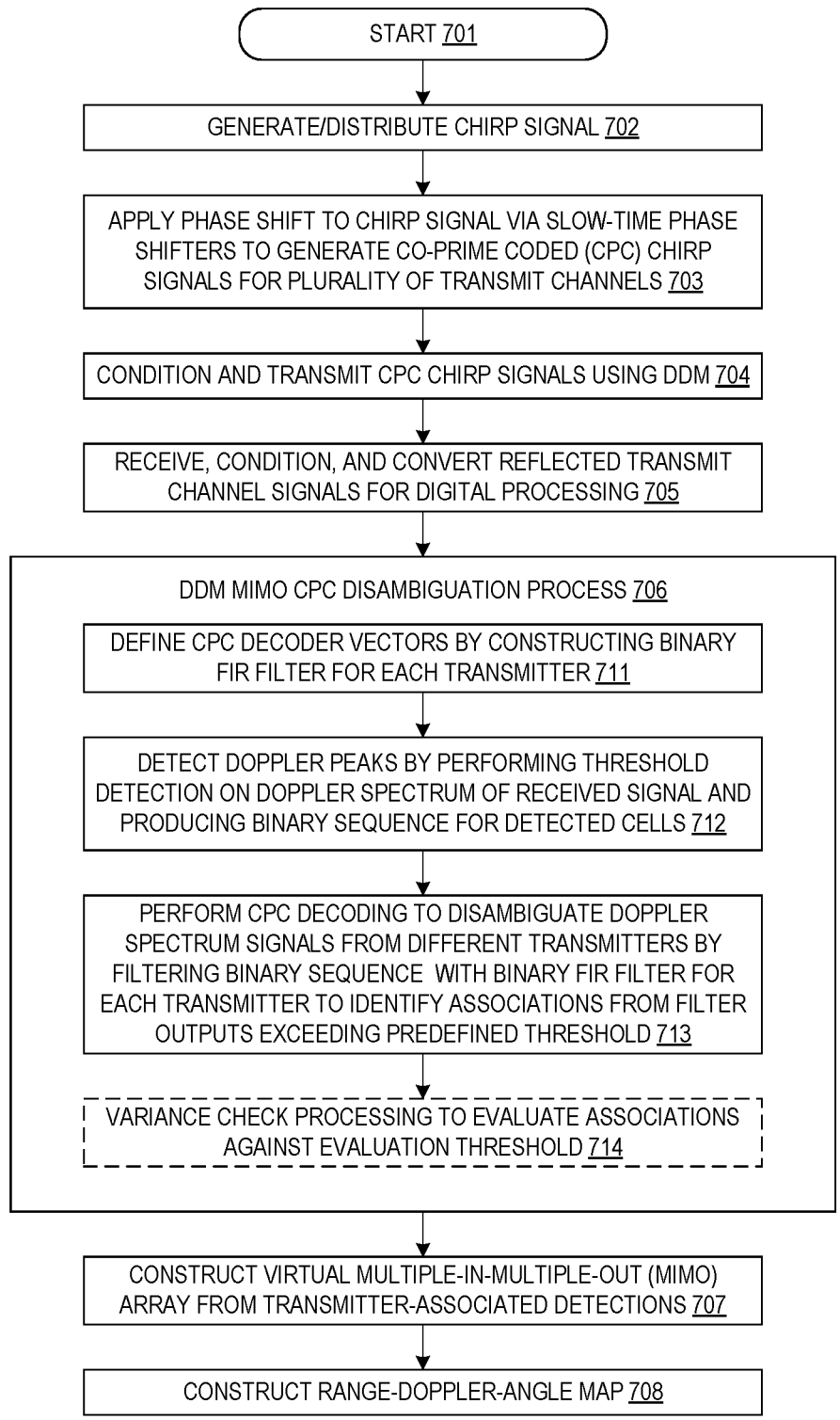
FIG. 7 illustrates a simplified flow chart showing the logic for using CPC DDM techniques to form a virtually large MIMO radar arrays.

To provide additional details for an improved understanding of selected embodiments of the present disclosure, reference is now made to FIG. 7 which depicts a simplified flow chart 700 showing the logic for using CPC DDM techniques to form a virtually large MIMO radar arrays. In an example embodiment, the control logic and methodology shown in FIG. 7 may be implemented as hardware and/or software on a host computing system, processor, or microcontroller unit that includes processor and memory for storing programming control code for constructing and operating a large virtual MIMO radar arrays by introducing CPC-based phase offset modulations signals to reference chirp signals to enable separation of the transmitter signals in the Doppler-spectrum frequency domain for each range cell's outputs.

The process starts (step 701), such as when the radar system begins the process of sensing the location and movement of one or more target objects using one or more transmit radar signals that are sent over a plurality of transmit antennas. To generate the transmit radar signals, the radar system first generates a reference chirp signal (step 702), such as by periodically modulating a transmit radar signal with a frequency and/or phase shift. For example, with automotive Frequency Modulation Continuous Wave (FMCW) radars, the reference chirp signal may be generated as a Linear Frequency Modulation (LFM) waveform that is distributed to a plurality of transmit channel circuits which are respectively associated with a plurality of transmit antennas.

At step 703, the reference chirp signal is applied to a plurality of slow-time phase shifters to generate co-prime coded (CPC) phase-shifted chirp signals for a plurality of transmit channels. In selected embodiments, the phase shifting step may be implemented by applying the reference chirp signal to a plurality of phase shifters which are respectively controlled by a phase shift control signal to carefully imposing designed partitioning of the Doppler Spectrum for the transmitters following the co-prime number theory principle. In addition, one of the transmit channel circuits may be connected to directly receive the reference chirp signal without any phase shift modulation. Instead of evenly distributing the Doppler spectrum sections (as in typical DDM implementations), the processing at step 703 may use the phase shifters to introduce non-uniform progressive phase shifts to the reference chirp signals at the transmit channels to control the locations of zero-radial velocity of the transmitters so that the spacing values (between two adjacent zero-radial velocity Doppler bins, in number of bins) are consistent with co-prime number values in some units.

In an example embodiment of a 3-TX DDM MIMO radar system with 64 chirps (i.e. $N_c$=64 where $N_c$ is number of chirps), the phase shift control signals supplied to the phase shifters can chosen to result in a spacing of [17, 26, 21] (in modulo-$N_c$ sense in the wrapped spectrum) in PRF/64 [Hz] units such that the zero-radial velocity bins indices (0-based, from 0~$N_c$−1) of the three transmitters are [0, 17, 43] in PRF/64 [Hz] units, respectively. In this example, the spacing values are co-primes in PRF/64 [Hz] units because their prime factoring (e.g., 17=1*17, 26=1*2*13, and 21=1*3*7) do not share a common factor other than 1 so they can only be factored with prime numbers. The use of the co-prime based spacings ensures that individual Doppler detection peaks can be correctly associated with its transmitter in later steps.

In selected embodiments, the progressive phase coding in slow time (i.e., chirp time) may be achieved by using a phase rotator for each transmit channel. For an L-bit phase rotator, up to $2^L$ phase shift positions can be programmed at a quantization step size of $$\frac{\pi}{2^{L-1}}$$

radians or $$\frac{2\pi}{2^L}.$$

For example, the step size of a 6-bit phase rotator is $$\frac{\pi}{32}$$

radians or 5.625 degrees. In this case, the smallest phase progression amount between two chirps is 5.625 degrees, and the largest phase progression amount between two chirps is $$\frac{2^L-1}{2^{L-1}}\pi$$

or 354.375 degrees. In general, a k-th phase progression setting can be defined as $$\frac{k}{2^{L-1}}\pi,$$

where k=0, 1, 2, . . . $2^L$−1, and consequently, the phase offset for the m-th chirp is mod $$\left\{\frac{(m-1)k}{2^{L-1}}\pi, 2\pi\right\}[\text{rad}],$$

where m=1, 2, . . . $N_c$ and mod{∩, 2π} denotes the modulo-2π operator. In this case, the k-th phase progression setting will result in a zero-radial velocity occurring at $$\frac{k}{2^L}PRF \text{ [Hz]}$$

on the Doppler spectrum.

To carry out the example in which the zero-radial velocities are located at [0, 17, 43]-th bin of the 64-bin long Doppler spectrum, the settings for k are also [0, 17, 43] for a 6-bit phase rotator. The progressive phase coding in slow time for the first transmitter $TX_1$ will be evaluated at k=0, at k=17 for the second transmitter $TX_2$, and at k=43 for the third transmitter $TX_3$ (i.e., 0° from chirp-to-chirp for $TX_1$, 95.625° from chirp-to-chirp for $TX_2$, and 241.875° from chirp-to-chirp for $TX_3$).

As will be appreciated, a 6-bit phase rotator provides possible CPC coding integer values between 0 and 63. If the number of Doppler bins is 64, one can encode bin spacing with coprime numbers. If there are more than $2^L$ bins (e.g., 64 bins for the 6-bit case), the zero-radial velocity bin number, $N_{zrv,k}$, can be computed based on the equation $$N_{zrv,k} = \frac{kN_{Dop}}{2^L},$$

where $N_{Dop}$ is me number of Doppler bins (which may be greater than $N_c$), and where $N_{zrv,k}$ may not be an integer if $2^L$ does not divide $kN_{Dop}$. By choosing $N_{Dop}$ such that $N_{zrv,k}$ is an integer, the zero-radial velocity can align to the center to the Doppler bin. When $N_{Dop}$ is greater than $2^L$, the spacing values between zero-radial velocity may no longer be exactly co-primes, but this approximation should not affect the effectiveness of the CPC encoding scheme.

As described hereinabove, CPC coding may be used to achieve co-prime spacing between the zero-velocity points of transmitters on the Doppler spectrum, but it will be appreciated that other non-uniform spacing techniques may be used, including but not limited to quasi-coprime spacing to prevent the peak detections from being incorrectly associated to transmitters. In addition, some pseudo random spacing of the zero-radial velocity positions may be used in place of the co-prime method and still achieve good performance. Use of co-prime spacing ensures optimal decoding robustness, but acceptably good performance may still be achieved by using non co-prime but pseudo random spacings.

At step 704, the CPC chirp signals are conditioned and amplified for transmission over the corresponding transmit channel circuits using Doppler division multiplexing techniques. In selected embodiments, this processing is performed by the transmit channel circuits which each includes an RF conditioning module (which may include filtering, leveling, applying additional phase coding, or applying RF switching, of the output of the corresponding phase shifter) and power amplifier (which amplifies the RF conditioning module output for transmission over a corresponding transmit antenna).

At step 705, the reflected CPC-coded chirp signals from the different transmit channels are received, conditioned, and converted for digital processing at the receiver. In selected embodiments, one or more receive antennas at the receiver module receive target returns from the transmitted CPC-coded phase offset reference chirp signal waveforms as (radio frequency) antenna signals for subsequent amplification, such as by using a low noise amplifier to generate an amplified RF signal from the target returns. In addition, the received transmit channel signals reflected by targets (i.e., target signals) are mixed with the reference chirp signal at the receiver to generate an intermediate frequency (IF) signal. In selected embodiments, the mixing step may be implemented by applying the reference chirp signal to a receiver module mixer which is also connected to receive the received target signals for mixing with the reference chirp signal, thereby generating an intermediate frequency signal. In addition, the intermediate frequency signal may be conditioned for digital conversion. In selected embodiments, the conditioning process includes feeding the intermediate frequency signal to a high-pass filter, amplifying the filtered signal with a variable gain amplifier before being fed to a low-pass filter, thereby generating a re-filtered signal. In addition, the re-filtered conditioned IF signal may be fed to a high-speed analog/digital converter (ADC) which has a digital signal output that is suitable for digital processing.

At step 706, the digital processing is applied to separate the reflected transmit channel signals for each transmitter using DDM MIMO CPC disambiguation signal processing steps. While any suitable CPC disambiguation signal processing steps may be used at step 706, in selected embodiments, the processing may start at step 711 which defines CPC decoding vectors by constructing, for each transmitter, a binary FIR filter with tap delays following a unique coprime spacing sequence associated with the transmitter.

In operation, a Doppler peak may be associated to its transmitter by matching the peak appearances in the Doppler spectrum to each transmitter's unique peak appearance location code. In connection with the example illustrated in FIG. 6, the codes for the transmitters are (in bin numbers):

C1=[0, 17, 17+26]=[0, 17, 43] for transmitter #1,
C2=[0, 26, 26+21]=[0, 26, 47] for transmitter #2, and
C3=[0, 21, 21+17]=[0, 21, 38] for transmitter #3.

Since the values {17, 26, 21} are co-primes and the values {43, 47, 38} are also co-primes, the three decoding vectors (or simply codes) C1, C2, C3 guarantee unambiguous matching of peak appearances with respect to each transmitter. Owing to the characteristic of co-primes that the sums of coprime numbers are also co-primes, the code values are also co-prime.

Continuing with this example, the three peak location codes can be represented in a binary sequence format to form three binary FIR filter decoding vectors. In this case, the bit position in each sequence corresponding to each code's indicated position is set to be '1' while the rest are set to be '0'. For example, the three codes C1, C2, C3 can be written in binary form as:

C1=
[10000000000000000100000000000000000000000001]
C1=[1← 16 "0"s →1← 25 "0"s →1]
C2=
[100000000000000000000000000100000000000000000-01]
C2=[1← 25 "0"s →1← 20 "0"s →1]
C3=[100000000000000000000100000000000000001]
C3=[1← 20 "0"s →1← 16 "0"s →1]

The digital disambiguation processing step 706 may also include a Doppler peak detection step 712 which performs threshold detection on the Doppler spectrum of the received radar signal to produce a binary sequence of the length of Doppler spectrum samples with '1's only at the entries corresponding to the detected cells meeting the threshold requirement. While any suitable Doppler peak detection processing steps may be used, the processing at step 712 may be implemented by creating a binary sequence based on the peak detection results of the Doppler spectrum for each detected range bin and for each receiver. The peak amplitudes (complex value) should be buffered for subsequent MIMO array construction and angle estimation process, and optionally, for additional variance checking as described hereinbelow.

At step 713, CPC decoding is performed to disambiguate the Doppler spectrum signals from different transmitters by filtering the binary sequence (created at step 712) with binary FIR filter (created at step 711) for each transmitter to identify associations from filter outputs exceeding a predefined threshold, thereby recovering correct peak-to-transmitter associations. In selected embodiments, the CPC decoding process starts with any Doppler detection peak to test the $N_c$ CPC-decoding vector hypotheses by matching the subsequent N−1 peak locations. If peak detections exist in all N−1 code-indicated peak locations, a candidate match is declared. Due to the uniqueness of the codes, only one hypothesis should result in complete match.

While any suitable CPC decoding process may be used at step 713, selected embodiments of the CPC decoding technique may be implemented by correlating the binary detection sequence with each of the decoder-ring binary FIR filters and detecting a match at the correlator location when a correlator output equals N. In other words, for the filter output of a first transmitter (e.g., $TX_1$), the peak is associated to the first transmitter if the correlator outputs value N in a peak location, and so on. In general, for the case of large N, a decoder filter output threshold lower than N may be used to allow missed detection. For smaller N values, such as the 3-TX case, the threshold should be set to N (i.e., 3).

As an optional step 714, variance check processing may be applied to the evaluate the associations (identified at step 713) against one or more evaluation criteria to further reduce false association rate. As indicated with the dashed lines, the variance check processing step may be omitted or skipped in the disclosed sequence 700. However, selected embodiments of the variance check processing step may be used to improve the performance in dense target environments by evaluating, for each identified association, the variance of the Doppler spectrum samples matching the tap delay positions against a predefined variance-check evaluation threshold, and then identifying each identified association as "true" if the variance is no greater than the predefined evaluation threshold.

In the variance check processing step, the matched-location peak amplitudes identified with the CPC decoding step 713 may be further analyzed to ensure that the matching is not due to false target detections or coincidence caused by congested target scene. While any suitable evaluation processing may be used, in selected embodiments, a simple test statistic measurement, such as variance or standard deviation of the N peak amplitudes (in absolute values), may be computed and checked against a user-defined variance-check evaluation threshold. If the test statistic is below the user-defined evaluation threshold, a final association decision is made. The variance check processing step 714 may be used to address the low probability event where a detection of other targets occurs in a coded location such that a match is falsely detected. In such cases, a large variance would likely be generated since the other target's amplitude is unlikely to be the same as the legitimate target's amplitude. Conversely, the amplitude should be consistent for a true match, so by making sure the variance is below the evaluation threshold, a higher confidence in the decoding output is obtained.

At step 707, the virtual MIMO array is constructed from the transmitter-associated detections extracted from reflected transmit channel signals originating from distinct transmit channels. In selected embodiments, the output from processing at step 714 (which associates the Doppler detection peaks with the originating DDM transmitter) is used for constructing MIMO virtual array using mono-static and/or bi-static radar principles. To this end, the estimated Doppler shift or radial velocity may be determined by the bin position relative to the zero-radial velocity bin of each transmitter, and receiver outputs of the same radial velocity (i.e., the same relative bin numbers) are grouped to form MIMO array output following standard MIMO virtual array construction process.

At step 708, the MIMO virtual array outputs are processed by range, Doppler, and angle estimation processes and the target map is generated to identify the range, Doppler, and angle values for each detected target. The range, Doppler, and angle estimators are typically based on Fast Fourier Transform (FFT) and Discrete Fourier Transform (DFT) processors. More advanced spectral estimators including but not limited to Multiple-signal Classifier (MUSIC) and Estimator of Signal Parameters via Rotational Invariance Technique (ESPRIT) processors, may also be used for angle processing. In selected embodiments, the radar controller processor may be configured to produce map data identifying paired range (r), Doppler ($\dot{r}$) and angle (θ) values for each detected/target object.

Figure 8:
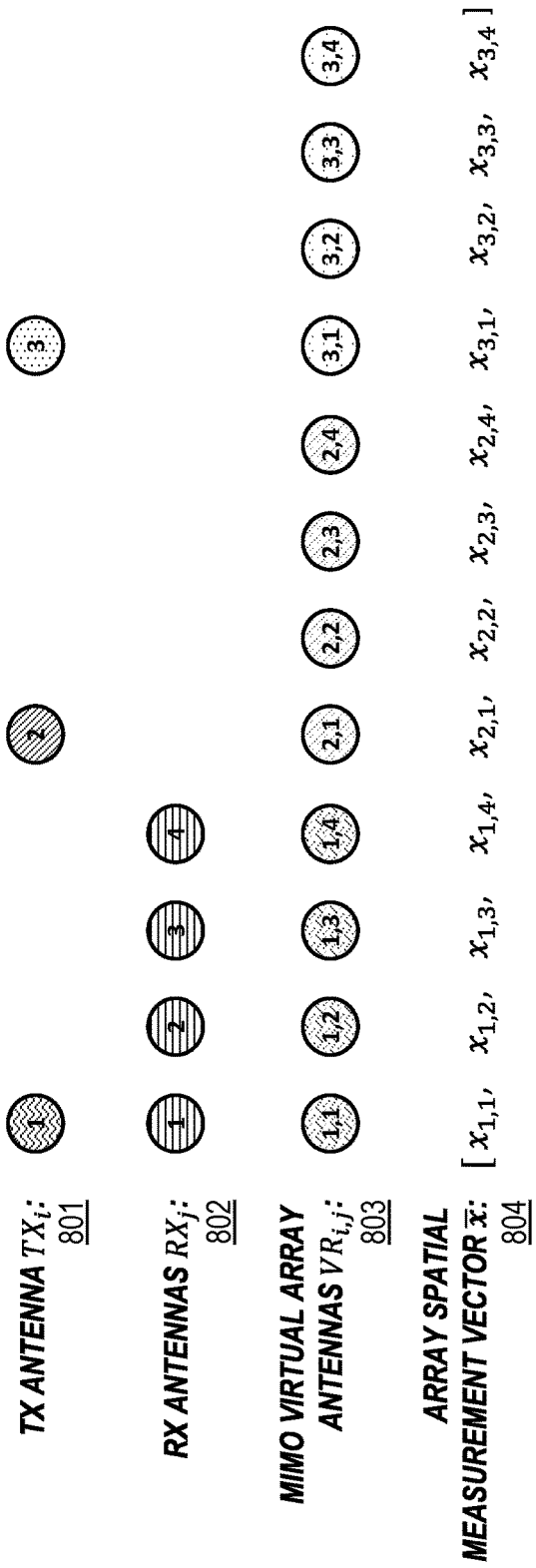
FIG. 8 is a simplified diagrammatic depiction of the physical radar apertures and MIMO virtual array apertures provided by 3-TX and 4-RX antennas in accordance with selected embodiments of the present disclosure.

To provide additional details for an improved understanding of selected embodiments of the present disclosure, reference is now made to FIG. 8 which depicts a simplified diagrammatic depiction 800 of the physical radar apertures 801, 802 and MIMO virtual array apertures 803 provided by an example radar device having 3-TX antenna 801 and 4-RX antennas 802. In the depicted radar device, the distributed arrangement of three transmit antennas $TX_1$-$TX_3$ 801 and four receiver antennas $RX_1$-$RX_4$ 802 are positioned and distributed in relation to one another as shown. Without loss of generality, the physical antennas are shown as being positioned in a linear fashion, but they may be arranged in a non-linear and/or interspersed fashion. The depicted MIMO virtual array antennas 803 are formed by transmitting radar signals from the three transmitting antennas $T_1$-$T_3$ which are received at the receiving antennas $R_1$-$R_4$. On the left side of the MIMO virtual array antenna 803, the MIMO virtual array elements $VR_{1,1}$, $VR_{1,2}$, $VR_{1,3}$, $VR_{1,4}$, are generated by the receiving antennas $R_1$-$R_4$ which receive radar transmit signals radiated by the first transmitting antenna $T_1$. In the middle of the MIMO virtual array antenna 803, the MIMO virtual array elements $VR_{2,1}$, $VR_{2,2}$, $VR_{2,3}$, $VR_{2,4}$, are generated by the receiving antennas $R_1$-$R_4$ which receive radar transmit signals radiated by the second transmitting antenna $T_2$. On the right side of the MIMO virtual array antenna 803, the MIMO virtual array elements $VR_{3,1}$, $VR_{3,2}$, $VR_{3,3}$, $VR_{3,4}$, are generated by the receiving antennas $R_1$-$R_4$ which receive radar transmit signals radiated by the third transmitting antenna $T_3$. As a result, the MIMO virtual array antenna 803 has more elements than the physical array of transmit and receive antennas 801, 802 and occupies a larger (wider) area. Since angular resolution is inversely proportional to aperture size, the MIMO virtual array aperture 803 provides improved angular resolution.

By transmitting CPC encoded chirp signals from the 3-TX antenna 801, the target returns received at the 4-RX antenna 802 can be processed using CPC decoding to associate Doppler peak detection samples from the target returns with the originating transmitters, and then used to construct the 12-element virtual array antennas $VR_{i,j}$ 803. In addition, a 12-element array spatial measurement output vector $\overline{x}$ 804 is then constructed and processed to estimate angles of arrival (AoA) for one or more targets. The process then repeats for next range bin of interest until all range bins of interest are processed.

Figure 9:
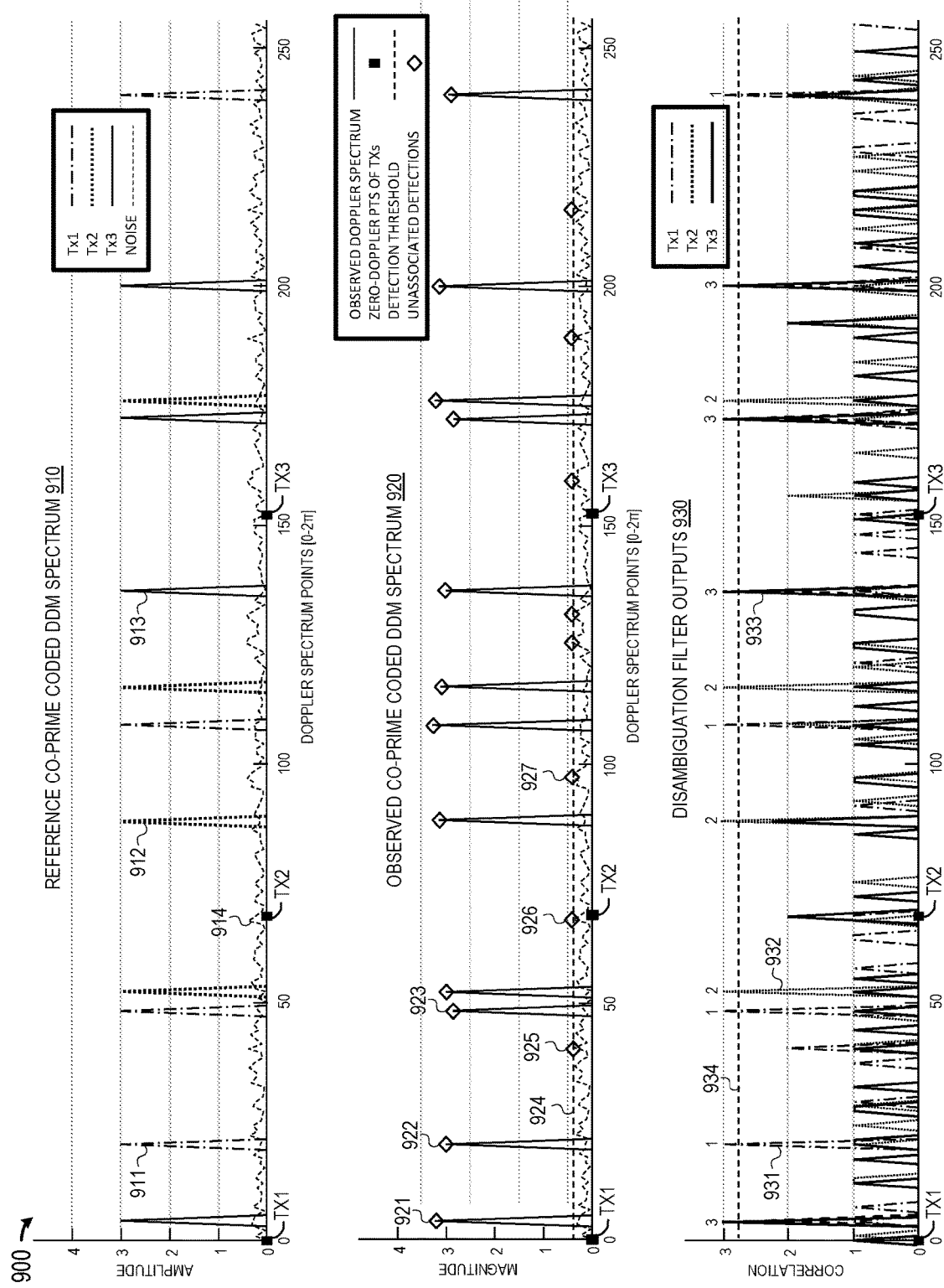
FIG. 9 depicts spectrum plots of a 3-TX CPC DDM MIMO radar system in which three targets are simulated to illustrate a CPC disambiguation process in accordance with selected embodiments of the present disclosure.

To provide additional details for an improved understanding of selected embodiments of the present disclosure, reference is now made to FIG. 9 which depicts spectrum plots 900 of a 3-TX CPC DDM MIMO radar system in which three targets are simulated to illustrate a CPC disambiguation process. In the depicted example, a total of 256 CPC encoded chirps are transmitted by three DDM transmitters, and a simulated range cell output sample of the 256 chirps containing three targets illuminated by the three DDM transmitters are processed to generate the observed co-prime coded DDM spectrum 920. For reference purposes, the true target-transmitter association generated with same CPC encoding is depicted in the top plot 910. In both cases, the CPC encoder is programmed such that the zero-radial velocity positions of the three transmitters TX1, TX2, TX3 are located at k=[0, 68, 152] (or equivalently at spacing values of [68, 84, 104]) which is based on scaled co-prime spacing values [17, 21, 26] with a scaling factor of 4 (or equivalently, zero-radial velocity positions [0, 17, 38] with a scaling factor of 4). The observed co-prime coded DDM spectrum 920 also depicts the detected peaks (e.g., 921-923) that are above a detection threshold 924, where the detected peaks are marked with '◇'. As seen from a comparison with the reference co-prime coded DDM spectrum 910, there are numerous false detections (e.g., 925-927) present in the observed co-prime coded DDM spectrum 920 due to noise.

As disclosed herein, the false detections may be filtered out with the CPC decoding process by using the CPC decoding vector FIR filters. The decoding result is illustrated in the disambiguation filter output plot 930 which shows the correlator outputs of each transmitter in different plot lines for the first transmitter 931 (dashed-dotted line), second transmitter 932 (dotted line), and third transmitter 933 (solid line). Correct associations are identified for each transmitter by finding the correlator output value close to the correction value, N (e.g., 3 in this case). In the disambiguation filter output plot 930, the identified solutions above the detection threshold line 934 are marked with numbers 1, 2, and 3 to indicate the transmitters associated to the Doppler peaks. All Doppler detections are correctly associated to the originating transmitters in this case.

Figure 10:
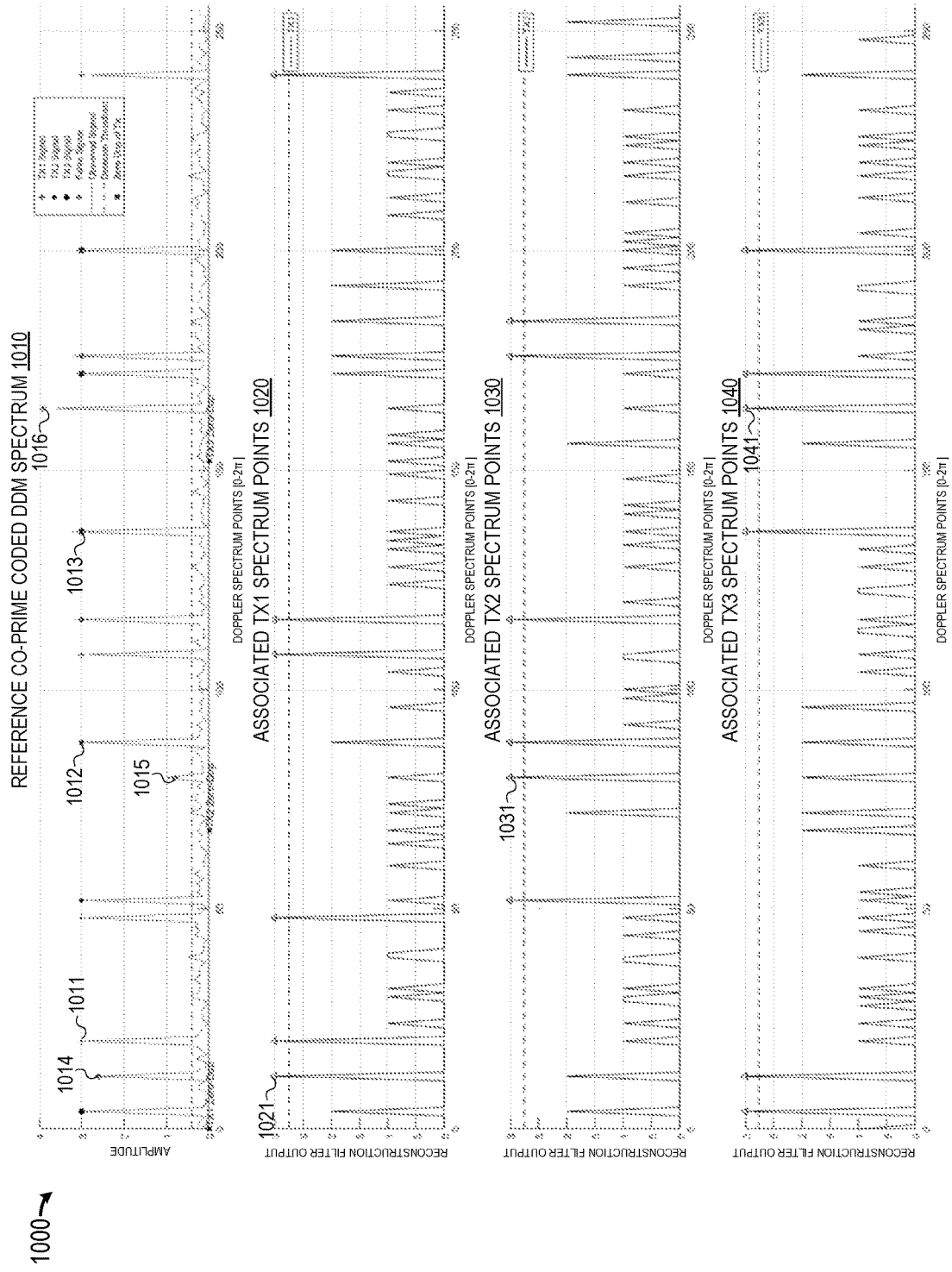
FIG. 10 depicts spectrum plots of a 3-TX CPC DDM MIMO radar system in which three targets are simulated along with three false Doppler signals to illustrate a CPC disambiguation process which results in CPC decoding errors.

To provide additional details for an improved understanding of selected embodiments of the present disclosure, reference is now made to FIG. 10 which depicts spectrum plots 1000 of a 3-TX CPC DDM MIMO radar system in which three targets are simulated along with three false Doppler signals to illustrate a CPC disambiguation process which results in CPC decoding errors. In the depicted example, a total of 256 CPC encoded chirps are transmitted by three DDM transmitters, and a simulated range cell output sample of the 256 chirps are processed to generate the co-prime coded DDM spectrum plot 1010 of the simulated slow-time range-bin output in which three targets are present. In addition to the target signals associated with the first transmitter (e.g., 1011), the second transmitter (e.g., 1012), and the third transmitter (e.g., 1013), the simulated plot 1010 includes three false Doppler signals 1014, 1015, 1016 (marked with '♦') which are added to confuse the decoding process. As a result, the co-prime coded DDM spectrum plots 1020, 1030, 1040 that are associated, respectively, with the transmitters Tx1, Tx2, Tx3, show false associations in the decoder outputs at detections 1021 (in the first transmitter's plot 1020), 1031 (in the second transmitter's plot 1030), and 1041 (in the third transmitter's plot 1040). If no further processing is performed, these false associations 1021, 1031, 1041 will be used to construct incorrect MIMO array outputs.

Figure 11:
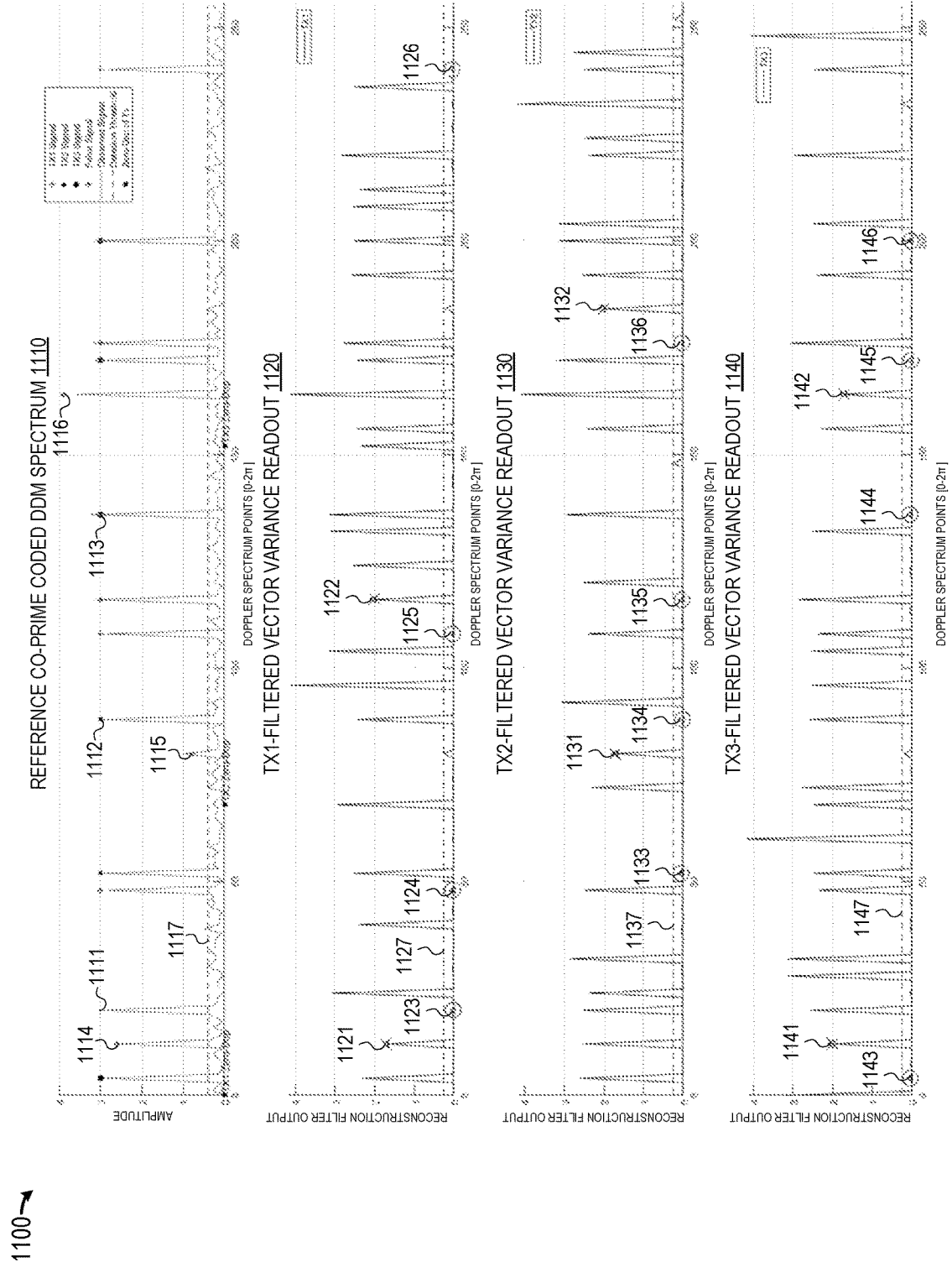
FIG. 11 depicts spectrum plots of a 3-TX CPC DDM MIMO radar system in which three targets are simulated along with three false Doppler signals to illustrate a CPC disambiguation process which results in CPC decoding errors that are corrected by a variance checking process in accordance with selected embodiments of the present disclosure.

To address the problem caused by false associations, reference is now made to FIG. 11 which depicts spectrum plots 1100 of a 3-TX CPC DDM MIMO radar system in which three targets are simulated along with three false Doppler signals to illustrate a CPC disambiguation process which results in CPC decoding errors that are corrected by a variance checking process in accordance with selected embodiments of the present disclosure. Again, the co-prime coded DDM spectrum plot 1110 is generated by simulating the transmission of 256 CPC encoded chirps by three DDM transmitters which results in the range cell output sample of the simulated slow-time range-bin output in which three targets are present. In addition to the target signals associated with the first transmitter (e.g., 1111), the second transmitter (e.g., 1112), and the third transmitter (e.g., 1113), the simulated reference CPC DDM spectrum plot 1110 includes three false Doppler signals 1114, 1115, 1116 (marked with '♦') which are added to confuse the decoding process. To filter out the false associations, the transmitter-filtered vector variance readout plots 1120, 1130, 1140 for the transmitters Tx1, Tx2, Tx3 depict the variance of the magnitudes of the samples corresponding to the indicated '1' locations of the decoding vector or correlator. As shown in each plot 1120, 1130, 1140, a threshold is used to detect associated peaks which have a sufficiently small variance. In this way, false associations that tend to have higher than acceptable variance are filtered out in this process. For example, the detection threshold 1127 in the first transmitter-filtered vector variance readout 1120 is used to identify the final associated peaks 1123-1126 (marked with '○') having a variance below the detection threshold 1127, and to filter out the peaks 1121-1122 (marked with 'x') having a variance above the detection threshold 1127. In addition, the detection threshold 1137 in the second transmitter-filtered vector variance readout 1130 is used to identify the final associated peaks 1133-1136 (marked with '○') having a variance below the detection threshold 1137, and to filter out the peaks 1131-1132 (marked with 'x') having a variance above the detection threshold 1137. Finally, the detection threshold 1147 in the third transmitter-filtered vector variance readout 1140 is used to identify the final associated peaks 1143-1146 (marked with '○') having a variance below the detection threshold 1147, and to filtered out the peaks 1141-1142 (marked with 'x') having a variance above the detection threshold 1147. In this way, correct results may be recovered.

As disclosed herein, selected embodiments of the disclosed CPC phase offset DDM MIMO radar system may provide several enhancements when compared with conventional radar systems. In addition to enabling the construction of very large MIMO arrays for automotive Frequency Modulation Continuous Wave (FMCW) radars that transmit Linear Frequency Modulation (LFM) waveforms, the disclosed radar system can use RF front-end and signal processing blocks of existing radar designs without significant modifications, thereby minimizing the cost of developing the new solution. For example, the disclosed CPC encoded chirp programming and processing method can be implemented on current and next generation radar front-end MMICs and radar micro controller/processor unit (MCU) to enable the full DDM MIMO capability without relying on ultra-short chirp radar systems. In addition, the disclosed use of co-prime values to encode different transmitters with non-uniform spacing ensures a much higher probability of correctly associating Doppler peaks with the originating transmitter due to the nature of co-prime numbers. Another advantage is the robustness of the disclosed CPC coding technique which scales with number of transmitters as the code length increases, whereas conventional approaches cannot scale robustly as the single interruption may not be a strong differentiation and ambiguity may still occur. For example, U.S. Patent No. 2020/0049812A1 to Jansen teaches an encoding scheme using a binary phase shifter with Walsh-Hadamard binary phase coding sequence to emulate a DDM spectrum with uniform spacing, where 4 uniform zero-velocity transmitters are encoded using the Walsh-Hadamard scheme so that one transmitter location is left vacant and 3 transmitters are supported to perform DDM MIMO radar processing. With this conventional approach, the decoding power is much weaker since the use of suboptimal Hadamard codes can only create uniform spacing resulting in highly similar codes and worse where the Doppler spectrum will contain spurious response (false peaks) due to the emulation of progressive phase shift using binary code, whereas the present disclosures use of multi-bit phase rotators to directly encode the signal to provide non-uniform spacing to enable differentiation between transmitter associations.

By now it should be appreciated that there has been provided a radar architecture, circuit, method, and system in which a reference signal generator is configured to produce a transmit reference signal a sequence of waveforms (e.g., a chirp signal). In addition, the radar system includes a plurality of Doppler division multiplexing (DDM) transmit modules that are connected and configured to produce, condition, and transmit a plurality of transmit signals over N transmit antennas, each transmit signal having a different co-prime coded (CPC) progressive phase offset from the transmit reference signal. In selected embodiments, each DDM transmit module includes a slow-time phase offset shifter connected to generate a co-prime encoded progressive phase offset signal from the transmit reference signal. In selected embodiments, the slow-time phase offset shifter may be implemented as an L-bit phase rotator for providing CPC coding integer values between 0 and $2^L$ to introduce a CPC-coded progressive phase shift to the transmit reference signal. In addition, each DDM transmit module may include a signal encoder to encode the co-prime encoded progressive phase offset signal using signal conditioning and power amplification to produce and transmit one of the transmit signals as a radio frequency encoded transmit signal over a transmit antenna. In other embodiments, the plurality of DDM transmit modules encode the transmit reference signal to define zero-radial velocity locations of the DDM transmitter modules to have spacing values consistent with co-prime number based values. The radar system also includes at least a first receiver module connected and configured to receive a target return signal reflected from the plurality of transmit signals by at least one target and to generate a digital signal from the target return signal. The radar system also includes a radar control processing unit configured to detect Doppler spectrum peaks in the digital signal, where the radar control processing unit includes a Doppler disambiguation module that is configured with a CPC decoder to associate each detected Doppler spectrum peak with a corresponding DDM transmit module, thereby generating a plurality of transmitter-associated Doppler spectrum peak detections. In selected embodiments, the Doppler disambiguation module is configured to construct, for each DDM transmit module, a binary FIR transmitter filter with tap delays following a unique coprime spacing sequence associated with the transmit module. In such embodiments, the Doppler disambiguation module may be configured to perform threshold detection on a Doppler spectrum generated from the digital signal and to generate a binary detection sequence of Doppler spectrum samples with '1's only at the entries corresponding to detected cells. In addition, the Doppler disambiguation module may be configured to filter the binary detection sequence with each binary FIR transmitter filter for associating spectrum peaks to corresponding DDM transmit modules if corresponding filter outputs exceed a predefined threshold, thereby identifying transmitter-associated detections. In addition, the Doppler disambiguation module may be configured to evaluate, for each transmitter-associated detection, variance of the magnitudes of Doppler spectrum samples that match tap delay positions in the binary FIR transmitter filter against an evaluation threshold to confirm each transmitter-associated detection having a variance at or below the evaluation threshold. In selected embodiments, the radar control processing unit may also be configured to construct a MIMO virtual array from the plurality of transmitter-associated Doppler spectrum peak detections.

In another form, there is provided a radar system architecture and method for operating same. In the disclosed methodology, a linear frequency modulation (LFM) chirp signal is generated. In addition, a plurality of DDM transmit signals is generated from the LFM chirp signal with a plurality of DDM transmitter modules, each having a different co-prime coded (CPC) phase offset from the LFM chirp signal. In selected embodiments, the DDM transmit signals are generated by encoding the LFM chirp signal to define a zero-radial velocity locations for the plurality of DDM transmitter modules to have spacing values consistent with co-prime number based values. In other embodiments, the DDM transmit signals are generated by applying a plurality of phase shifts to the LFM chirp signal using a corresponding plurality of multi-bit slow-time phase offset shifters to generate a plurality of CPC progressive phase offset signals from the LFM chirp signal, each having a different CPC phase offset from the LFM chirp signal. In such embodiments, each of the multi-bit slow-time phase offset shifters may be implemented with an L-bit phase rotator for providing CPC coding integer values between 0 and $2^L$ to introduce a CPC-coded progressive phase shift to the LFM chirp signal. In the disclosed methodology, one or more receive antennas of a receiver module receive a target return signal that is reflected from the plurality of DDM transmit signals by a target. The disclosed methodology also includes mixing the target return signal with the LFM chirp signal at the receiver module to produce an intermediate frequency signal, and then converting the intermediate frequency signal to a digital signal with an analog-to-digital converter at the receiver module. In the disclosed methodology, the digital signal is then processed to detect Doppler spectrum peaks in the digital signal. Finally, the disclosed methodology applies a CPC decoder to associate each detected Doppler spectrum peak with a corresponding DDM transmitter module, thereby generating a plurality of transmitter-associated Doppler spectrum peak detections. In selected embodiments, the CPC decoder may be applied by constructing, for each DDM transmitter module, a binary FIR transmitter filter with tap delays following a unique coprime spacing sequence associated with the DDM transmitter module. In such embodiments, the CPC decoder may be applied by performing threshold detection on a Doppler spectrum generated from the digital signal, and then generating a binary detection sequence of Doppler spectrum samples with '1's only at the entries corresponding to detected cells. In addition, the application of the CPC decode may include filtering the binary detection sequence with each binary FIR transmitter filter to associate spectrum peaks to corresponding DDM transmit modules if corresponding filter outputs exceed a predefined threshold, thereby identifying transmitter-associated detections. In addition, the disclosed methodology may include evaluating, for each transmitter-associated detection, variances of the magnitudes of the Doppler spectrum samples that match tap delay positions in the binary FIR transmitter filter against an evaluation threshold to confirm each transmitter-associated detection having a variance at or below the evaluation threshold. The disclosed methodology may also construct a MIMO virtual array from the plurality of transmitter-associated Doppler spectrum peak detections.

In still yet another form, there is provided a radar architecture, circuit, method, and system. In the disclosed system, a plurality of transmitter modules is configured to simultaneously transmit a plurality of Doppler Division Multiplexing (DDM) linear chirp waveforms in a single transmission frame having a fixed pulse repetition frequency (PRF) rate, where each DDM linear chirp waveform is encoded with different co-prime coded (CPC) phase offset using a programmable multi-bit phase rotator so that Doppler spectrum signals of different transmitter modules can be separated in a single transmission frame when there is overlap between spectrums from different transmitter modules. In addition, at least a first receiver module is connected and configured to receive a target return signal reflected from the plurality of DDM linear chirp waveforms by at least one target and to generate a digital signal from the target return signal. In addition, a radar control processing unit is configured to detect Doppler spectrum peaks in the digital signal and to apply CPC decoding to associate each detected Doppler spectrum peak with a corresponding transmitter module, thereby generating a plurality of transmitter-associated Doppler spectrum peak detections. In selected embodiments, the radar control processing unit is configured to construct, for each transmitter module, a binary FIR transmitter filter with tap delays following a unique coprime spacing sequence associated with the transmitter module. In addition, the radar control processing unit may be configured to perform threshold detection on a Doppler spectrum generated from the digital signal and to generate a binary detection sequence of Doppler spectrum samples with '1's only at the entries corresponding to detected cells. The radar control processing unit may also be configured to filter the binary detection sequence with each binary FIR transmitter filter for associating spectrum peaks to corresponding transmitter modules if corresponding filter outputs exceed a predefined threshold, thereby identifying transmitter-associated detections. Finally, the radar control processing unit may be configured evaluate, for each transmitter-associated detection, variances of the magnitudes of the Doppler spectrum samples that match tap delay positions in the binary FIR transmitter filter against an evaluation threshold to confirm each transmitter-associated detection having a variance at or below the evaluation threshold.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A radar system comprising:
    a reference signal generator configured to produce a transmit reference signal comprising a sequence of waveforms;
    a plurality of Doppler division multiplexing (DDM) transmit modules configured to produce, condition, and transmit a plurality of transmit signals over N transmit antennas, each transmit signal having a different co-prime coded (CPC) phase offset from the transmit reference signal;
    at least a first receiver module configured to receive a target return signal reflected from the plurality of transmit signals by at least one target and to generate a digital signal from the target return signal; and
    a radar control processing unit configured to detect Doppler spectrum peaks in the digital signal, the radar control processing unit comprising a Doppler disambiguation module that is configured with a CPC decoder to associate each detected Doppler spectrum peak with a corresponding DDM transmit module, thereby generating a plurality of transmitter-associated Doppler spectrum peak detections.

2. The radar system of claim 1, where the radar control processing unit is further configured to construct a MIMO virtual array from the plurality of transmitter-associated Doppler spectrum peak detections.

3. The radar system of claim 1, where each DDM transmit module comprises:
    a slow-time phase offset shifter configured to generate a co-prime encoded progressive phase offset signal from the transmit reference signal; and
    a signal encoder to encode the co-prime encoded progressive phase offset signal using signal conditioning and power amplification to produce and transmit one of the plurality of transmit signals as a radio frequency encoded transmit signal over a transmit antenna.

4. The radar system of claim 1, where the plurality of DDM transmit modules encode the transmit reference signal to define zero-radial velocity locations of the DDM transmitter modules to have spacing values consistent with co-prime number based values.

5. The radar system of claim 3, where the slow-time phase offset shifter comprises an L-bit phase rotator for providing CPC coding integer values between 0 and $2^L$ to introduce a CPC-coded progressive phase shift to the transmit reference signal.

6. The radar system of claim 1, where the Doppler disambiguation module is configured to construct, for each DDM transmit module, a binary FIR transmitter filter with tap delays following a unique coprime spacing sequence associated with the transmit module.

7. The radar system of claim 6, where the Doppler disambiguation module is configured to perform threshold detection on a Doppler spectrum generated from the digital signal and to generate a binary detection sequence of Doppler spectrum samples with '1's only at the entries corresponding to detected cells.

8. The radar system of claim 7, where the Doppler disambiguation module is configured to filter the binary detection sequence with each binary FIR transmitter filter for associating spectrum peaks to corresponding DDM transmit modules if corresponding filter outputs exceed a predefined threshold, thereby identifying transmitter-associated detections.

9. The radar system of claim 8, where the Doppler disambiguation module is configured to evaluate, for each transmitter-associated detection, variances of the magnitudes of the Doppler spectrum samples that match tap delay positions in the binary FIR transmitter filter against an evaluation threshold to confirm each transmitter-associated detection having a variance at or below the evaluation threshold.

10. A method for operating a Doppler Division Multiplexing (DDM) Multiple-Input-Multiple-Output (MIMO) radar system, comprising:
generating a linear frequency modulation (LFM) chirp signal;
generating a plurality of DDM transmit signals from the LFM chirp signal with a plurality of DDM transmitter modules, each having a different co-prime coded (CPC) phase offset from the LFM chirp signal;
receiving, at one or more receive antennas of a receiver module, a target return signal reflected from the plurality of DDM transmit signals by a target;
mixing the target return signal with the LFM chirp signal at the receiver module to produce an intermediate frequency signal;
converting the intermediate frequency signal to a digital signal with an analog-to-digital converter at the receiver module;
processing the digital signal to detect Doppler spectrum peaks in the digital signal; and
applying a CPC decoder to associate each detected Doppler spectrum peak with a corresponding DDM transmitter module, thereby generating a plurality of transmitter-associated Doppler spectrum peak detections.

11. The method of claim 10, further comprising constructing a MIMO virtual array from the plurality of transmitter-associated Doppler spectrum peak detections.

12. The method of claim 10, where generating the plurality of DDM transmit signals comprises encoding the LFM chirp signal to define a zero-radial velocity locations for the plurality of DDM transmitter modules to have spacing values consistent with co-prime number based values.

13. The method of claim 10, where generating the plurality of DDM transmit signals comprises applying a plurality of phase shifts to the LFM chirp signal using a corresponding plurality of multi-bit slow-time phase offset shifters to generate a plurality of CPC progressive phase offset signals from the LFM chirp signal, each having a different CPC phase offset from the LFM chirp signal.

14. The method of claim 13, where each of the plurality of multi-bit slow-time phase offset shifters comprises an L-bit phase rotator for providing CPC coding integer values between 0 and $2^L$ to introduce a CPC-coded progressive phase shift to the LFM chirp signal.

15. The method of claim 10, where applying the CPC decoder comprises constructing, for each DDM transmitter module, a binary FIR transmitter filter with tap delays following a unique coprime spacing sequence associated with the DDM transmitter module.

16. The method of claim 15, where applying the CPC decoder comprises:
performing threshold detection on a Doppler spectrum generated from the digital signal; and
generating a binary detection sequence of Doppler spectrum samples with '1's only at the entries corresponding to detected cells.

17. The method of claim 16, where applying the CPC decoder comprises filtering the binary detection sequence with each binary FIR transmitter filter to associate spectrum peaks to corresponding DDM transmit modules if corresponding filter outputs exceed a predefined threshold, thereby identifying transmitter-associated detections.

18. The method of claim 17, further comprising evaluating, for each transmitter-associated detection, variances of the magnitudes of the Doppler spectrum samples that match tap delay positions in the binary FIR transmitter filter against an evaluation threshold to confirm each transmitter-associated detection having a variance at or below the evaluation threshold.

19. A radar system comprising:
a plurality of transmitter modules configured to simultaneously transmit a plurality of Doppler Division Multiplexing (DDM) linear chirp waveforms in a single transmission frame having a fixed pulse repetition frequency (PRF) rate, where each DDM linear chirp waveform is encoded with different co-prime coded (CPC) phase offset using a programmable multi-bit phase rotator so that Doppler spectrum signals of different transmitter modules can be separated in a single transmission frame when there is overlap between spectrums from different transmitter modules;
at least a first receiver module configured to receive a target return signal reflected from the plurality of DDM linear chirp waveforms by at least one target and to generate a digital signal from the target return signal; and
a radar control processing unit configured to detect Doppler spectrum peaks in the digital signal and to apply CPC decoding to associate each detected Doppler spectrum peak with a corresponding transmitter module, thereby generating a plurality of transmitter-associated Doppler spectrum peak detections.

20. The radar system of claim 19, where the radar control processing unit is configured to:
construct, for each transmitter module, a binary FIR transmitter filter with tap delays following a unique coprime spacing sequence associated with the transmitter module;
perform threshold detection on a Doppler spectrum generated from the digital signal and to generate a binary detection sequence of Doppler spectrum samples with '1's only at the entries corresponding to detected cells;
filter the binary detection sequence with each binary FIR transmitter filter for associating spectrum peaks to corresponding transmitter modules if corresponding filter outputs exceed a predefined threshold, thereby identifying transmitter-associated detections; and
evaluate, for each transmitter-associated detection, variances of the magnitudes of the Doppler spectrum samples that match tap delay positions in the binary FIR transmitter filter against an evaluation threshold to confirm each transmitter-associated detection having a variance at or below the evaluation threshold.

* * * * *